US010206147B2

(12) United States Patent
Horn et al.

(10) Patent No.: US 10,206,147 B2
(45) Date of Patent: Feb. 12, 2019

(54) SERVING GATEWAY RELOCATION AND SECONDARY NODE ELIGIBILITY FOR DUAL CONNECTIVITY

(71) Applicant: QUALCOMM, Incorporated, San Diego, CA (US)

(72) Inventors: Gavin Bernard Horn, La Jolla, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 14/576,086

(22) Filed: Dec. 18, 2014

(65) Prior Publication Data
US 2015/0181473 A1 Jun. 25, 2015

Related U.S. Application Data

(60) Provisional application No. 61/918,659, filed on Dec. 19, 2013.

(51) Int. Cl.
H04W 36/00 (2009.01)
H04W 72/04 (2009.01)
(Continued)

(52) U.S. Cl.
CPC ... *H04W 36/0027* (2013.01); *H04W 36/0033* (2013.01); *H04W 36/12* (2013.01);
(Continued)

(58) Field of Classification Search
CPC .......... H04W 36/0027; H04W 76/025; H04W 36/0033; H04W 72/048; H04W 88/08
(Continued)

(56) References Cited

U.S. PATENT DOCUMENTS 9,444,745 B2 * 9/2016 Blankenship ........... H04L 47/20
2010/0272115 A1 * 10/2010 Ramankutty ....... H04W 76/041
370/401
(Continued)

FOREIGN PATENT DOCUMENTS

GB 2482449 A 2/2012

OTHER PUBLICATIONS

"3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12)", 3GPP Standard; 3GPP TR 36.842, 3rd Generation Partnership Project (3GPP), Mobile Competence Centre; 650, Route Des Lucioles; F-06921 Sophia-Antipolis Cedex; France, vol. RAN WG2, No. V1.0.0, Nov. 26, 2013 (Nov. 26, 2013), pp. 1-68, XP050728662, [retrieved on Nov. 26, 2013].
(Continued)

Primary Examiner — Rasheed Gidado
(74) Attorney, Agent, or Firm — Harrity & Harrity, LLP

(57) ABSTRACT

Systems and methods for wireless communication are described herein. In one aspect, a method may include establishing, by a first base station, a connection to a User Equipment (UE) and identifying a second base station to which the UE can also connect, determining whether dual connectivity of the UE to the base stations is permitted, and selecting, based on the determining, handing over the UE to the second base station or initiating dual connectivity for the UE. In another aspect, a method may include receiving a request for modifying bearers routed via a first gateway node for dual connectivity of a UE to a master base station and a secondary base station, determining that the modification requires bearers to relocate to a second gateway node, and rejecting the request or relocating all bearers associated with
(Continued)

the UE to the second gateway node, based on the determining.

30 Claims, 22 Drawing Sheets

(51) Int. Cl.
*H04W 36/12* (2009.01)
*H04W 76/15* (2018.01)
*H04W 88/08* (2009.01)
*H04W 72/00* (2009.01)

(52) U.S. Cl.
CPC ......... *H04W 72/048* (2013.01); *H04W 76/15* (2018.02); *H04W 72/00* (2013.01); *H04W 72/04* (2013.01); *H04W 88/08* (2013.01)

(58) Field of Classification Search
USPC .................................................. 370/310–350
See application file for complete search history.

(56) References Cited

U.S. PATENT DOCUMENTS

| | | | | |
|---|---|---|---|---|
| 2015/0124748 A1* | 5/2015 | Park | ...................... | H04L 5/0032 370/329 |
| 2015/0146599 A1* | 5/2015 | Jha | ........................ | H04L 5/0032 370/311 |
| 2015/0223284 A1* | 8/2015 | Jain | ....................... | H04W 48/14 370/329 |
| 2015/0334551 A1* | 11/2015 | Aminaka | .............. | H04W 8/065 370/252 |
| 2016/0174285 A1* | 6/2016 | Ke | .......................... | H04W 8/06 370/329 |
| 2016/0183323 A1* | 6/2016 | Rahman | ............ | H04W 74/0833 370/329 |
| 2016/0242754 A1* | 8/2016 | McCormack | ........ | A61B 17/025 |
| 2016/0249259 A1* | 8/2016 | Park | ...................... | H04W 36/00 |

OTHER PUBLICATIONS

Catt, "Overall Signaling flow over S1/Xn for 1A", 3GPP Draft; R3-132036, 3rd Generation Partnership Project (3GPP), Mobile Competence Centre; 650, Route Des Lucioles; F-06921 Sophia-Antipolis Cedex; France, vol. RAN WG3, No. San Francisco, CA, USA; Nov. 11, 2013-Nov. 15, 2013, Nov. 12, 2013 (Nov. 12, 2013), 8 Pages, XP050738158, Retrieved from the Internet: URL: http://www.3gpp.org/ftp/Meetings_3GPP_SYNC/RAN/RAN3/Docs/ [retrieved on Nov. 12, 2013].
Catt, "Support of SIPTO LAMB DAN in RAN3", 3GPP Draft; R3-130834, 3rd Generation Partnership Project (3GPP), Mobile Competence Centre; 650, Route Des Lucioles; F-06921 Sophia-Antipolis Cedex; France, vol. RAN WG3, No. Fukuoka, Japan; May 20, 2013-May 24, 2013, May 10, 2013 (May 10, 2013), pp. 1-3, XP050700870, Retrieved from the Internet: URL: http://www.3gpp.org/ftp/tsg_ran/WG3_lu/TSGR3_80/Docs/ [retrieved on May 10, 2013] p. 1-p. 4.
Ericsson: "S-GW Relocation in the context of DC scenarios", 3GPP Draft; R3-140343, 3rd Generation Partnership Project (3GPP), Mobile Competence Centre; 650, Route Des Lucioles; F-06921 Sophiaantipolis Cedex; France, vol. RAN WG3, No. Prague, Czech Republic; Feb. 10, 2014-Feb. 14, 2014, Feb. 9, 2014 (Feb. 9, 2014), pp. 1-4, XP050738782, Retrieved from the Internet: URL: http://www.3gpp.org/ftp/Meetings_3GPP_SYNC/RAN/RAN3/Docs/ [retrieved on Feb. 9, 2014].
Interdigital Communications: "Control Plane Aspects with Dual Connectivity for Small Cell Deployments", 3GPP Draft; R2-132718 (REL-12 LTE SC SI—Control Plane Dual Connectivity) (1), 3rd Generation Partnership Project (3GPP), Mobile Competence Centre; 650, Route Des Lucioles; F-06921 Sophia-Antipolis, vol. RAN WG2, No. Barcelona, Spain; Aug. 19, 2013-Aug. 23, 2013, Aug. 10, 2013 (Aug. 10, 2013), pp. 1-4, XP050718487, Retrieved from the Internet: URL: http://www.3gpp.org/ftp/tsg_ran/WG2_RL2/TSGR2_83/Docs/ [retrieved on Aug. 10, 2013] p. 1-p. 4.
International Search Report and Written Opinion—PCT/US2014/071510—ISA/EPO—dated Sep. 16, 2015.
Alcatel-Lucent.,et al., "SeNB Configuration/Reconfiguration and UE Capability Handling", 3GPP Draft; R2-134378 Small Cell UE Capability Handling, 3rd Generation Partnership Project (3GPP), Mobile Competence Centre; 650, Route Des Lucioles; F-06921 Sophia-Antipolis Cedex; France, vol. RAN WG2, No. San Francisco, U.S.A.; Nov. 11, 2013-Nov. 15, 2013 Nov. 13, 2013 (Nov. 13, 2013), 4 pages, XP050737089, Retrieved from the Internet: URL: http://www.3gpp.org/ftp/Meetings_3GPP_SYNC/RAN/RAN2/Docs/ [retrieved on Nov. 13, 2013].
European Search Report—EP17190655—Search Authority—Munich—dated Nov. 28, 2017.
Intel Corporation: "Remaining Issues in Control Plane Architecture", 3GPP Draft; R2-134263 Remaining Issues in Control Plane Architecture, 3rd Generation Partnership Project (3GPP), Mobile Competence Centre; 650, Route Des Lucioles ; F-06921 Sophia-Antipolis Cedex; France, vol. RAN WG2, No. San Francisco, USA; Nov. 11, 2013-Nov. 15, 2013 Nov. 13, 2013 (Nov. 13, 2013), 3 pages, XP050737003, Retrieved from the Internet: URL: http://www.3gpp.org/ftp/Meetings_3GPP_SYNC/RAN/RAN2/Docs/ [retrieved on Nov. 13, 2013].
Ericsson: "Signalling Procedures for Dual Connectivity", 3GPP Draft; R2-134219—Signalling Procedures for Dual Connectivity, 3rd Generation Partnership Project (3GPP), Mobile Competence Centre; 650 Lucioles; F-06921 Sophia-Antipolis Cedex; FR, Nov. 2013, 9 Pages.
Renesas Mobile Europe Ltd: "On Comparison between Solutions 1A/2A and 2C", 3GPP TSG-RAN WG2#83bis R2-133344, 3 Pages, Nov. 10, 2013, URL: http://www.3gpp.org/ftp/tsg_ran/WG2_RL2/TSGR2_83bis/Docs/R2-133344.zip.

* cited by examiner

```
                    ┌─1910
┌─────────────────────────────────────────────┐
│ RECEIVING, BY A CORE NETWORK ENTITY, A REQUEST│
│ FOR MODIFICATION OF BEARERS ROUTED VIA A FIRST│
│ GATEWAY NODE FOR DUAL CONNECTIVITY OF A USER │
│ EQUIPMENT (UE) TO A MASTER BASE STATION AND A│
│           SECONDARY BASE STATION             │
└─────────────────────────────────────────────┘
                    │
                    ▼ ┌─1920
┌─────────────────────────────────────────────┐
│  DETERMINING THAT THE MODIFICATION REQUIRES  │
│   THE BEARERS TO BE RELOCATED TO A SECOND    │
│                GATEWAY NODE                  │
└─────────────────────────────────────────────┘
                    │
                    ▼ ┌─1930
┌─────────────────────────────────────────────┐
│ PERFORMING AT LEAST ONE OF: REJECTING THE    │
│   REQUEST, OR RELOCATING ALL THE BEARERS     │
│ ASSOCIATED WITH THE UE TO THE SECOND GATEWAY │
│     NODE, BASED ON THE DETERMINING           │
└─────────────────────────────────────────────┘
                    │
                    ▼ ┌─1940
┌─ ─ ─ ─ ─ ─ ─ ─ ─ ─ ─ ─ ─ ─ ─ ─ ─ ─ ─ ─ ─ ─ ┐
│  REPLYING TO THE REQUEST WITH A MESSAGE     │
│  INDICATING A REASON FOR THE REJECTING      │
└─ ─ ─ ─ ─ ─ ─ ─ ─ ─ ─ ─ ─ ─ ─ ─ ─ ─ ─ ─ ─ ─ ┘
```

SERVING GATEWAY RELOCATION AND SECONDARY NODE ELIGIBILITY FOR DUAL CONNECTIVITY

CROSS-REFERENCE TO RELATED APPLICATIONS

This application claims priority to and the benefit of U.S. Provisional Patent Application No. 61/918,659, entitled "SECURE GATEWAY RELOCATION AND SECONDARY NODE ELIGIBILITY FOR DUAL CONNECTIVITY" and filed Dec. 19, 2013, the contents of which are herein incorporated by reference in their entirety.

BACKGROUND

I. Field

The present disclosure relates generally to data transmission in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A wireless communication network may support operation on multiple carriers. A carrier may refer to a range of frequencies used for communication and may be associated with certain characteristics. For example, a carrier may be associated with system information describing operation on the carrier. A carrier may also be referred to as a component carrier (CC), a frequency channel, a cell, etc. A base station may transmit data and/or control information on multiple carriers to a UE for carrier aggregation. The UE may transmit data and/or control information on multiple carriers to the base station.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In a first aspect of the invention, there is provided a method of wireless communication. The method may include establishing, by a first base station of the wireless communication system, a connection to a User Equipment (UE) and identifying a second base station to which the UE is capable of connecting while also being connected to the first base station. The method may also include determining whether dual connectivity of the UE to the first base station and to the second base station is permitted and selecting, based on the determining, one of handing over the UE to the second base station or initiating the dual connectivity for the UE to the second base station.

In a second aspect of the invention, there is provided an apparatus configured for wireless communication. The apparatus may include means for establishing, by a first base station of the wireless communication system, a connection to a User Equipment (UE) and means for identifying a second base station to which the UE is capable of connecting while also being connected to the first base station. The apparatus may also include means for determining whether dual connectivity of the UE to the first base station and to the second base station is permitted and means for selecting, based on the determining, one of handing over the UE to the second base station or initiating the dual connectivity for the UE to the second base station.

In a third aspect of the invention, there is provided a non-transitory computer-readable medium holding encoded instructions, which when executed by a processor, cause a computer to perform steps. The steps may include receiving, by a core network entity, a request for modification of bearers routed via a first gateway node for dual connectivity of a User Equipment (UE) to a master base station and a secondary base station. The steps may also include determining that the modification requires the bearers to be relocated to a second gateway node and performing at least one of: rejecting the request, or relocating all the bearers associated with the UE to the second gateway node, based on the determining.

In a fourth aspect of the invention, there is provided an apparatus configured for wireless communication. The apparatus may include at least one processor and a memory coupled to the at least one processor. The at least one processor may be configured for receiving, by a core network entity, a request for modification of bearers routed via a first gateway node for dual connectivity of a User Equipment (UE) to a master base station and a secondary base station. The at least one processor may also be configured for determining that the modification requires the bearers to be relocated to a second gateway node and performing at least one of: rejecting the request, or relocating all the bearers associated with the UE to the second gateway node, based on the determining.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

FIGS. 16-22 are functional block diagrams illustrating example blocks executed to implement aspects of the present disclosure.

DETAILED DESCRIPTION

Techniques for supporting communication via multiple carriers for carrier aggregation in a wireless communication network are disclosed herein. These techniques may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 includes IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi and Wi-Fi Direct), IEEE 802.16 (WiMAX), IEEE 802.20, Flash-OFDM®, etc. UTRA, E-UTRA, and GSM are part of Universal Mobile Telecommunication System (UMTS). 3GPP Long Term Evolution (LTE) and LTE-Advanced (LTE-A), in both frequency division duplexing (FDD) and time division duplexing (TDD), are recent releases of UMTS that use E-UTRA, which employs OFDMA on the downlink and SC-FDMA on the uplink. UTRA, E-UTRA, GSM, UMTS, LTE and LTE-A are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
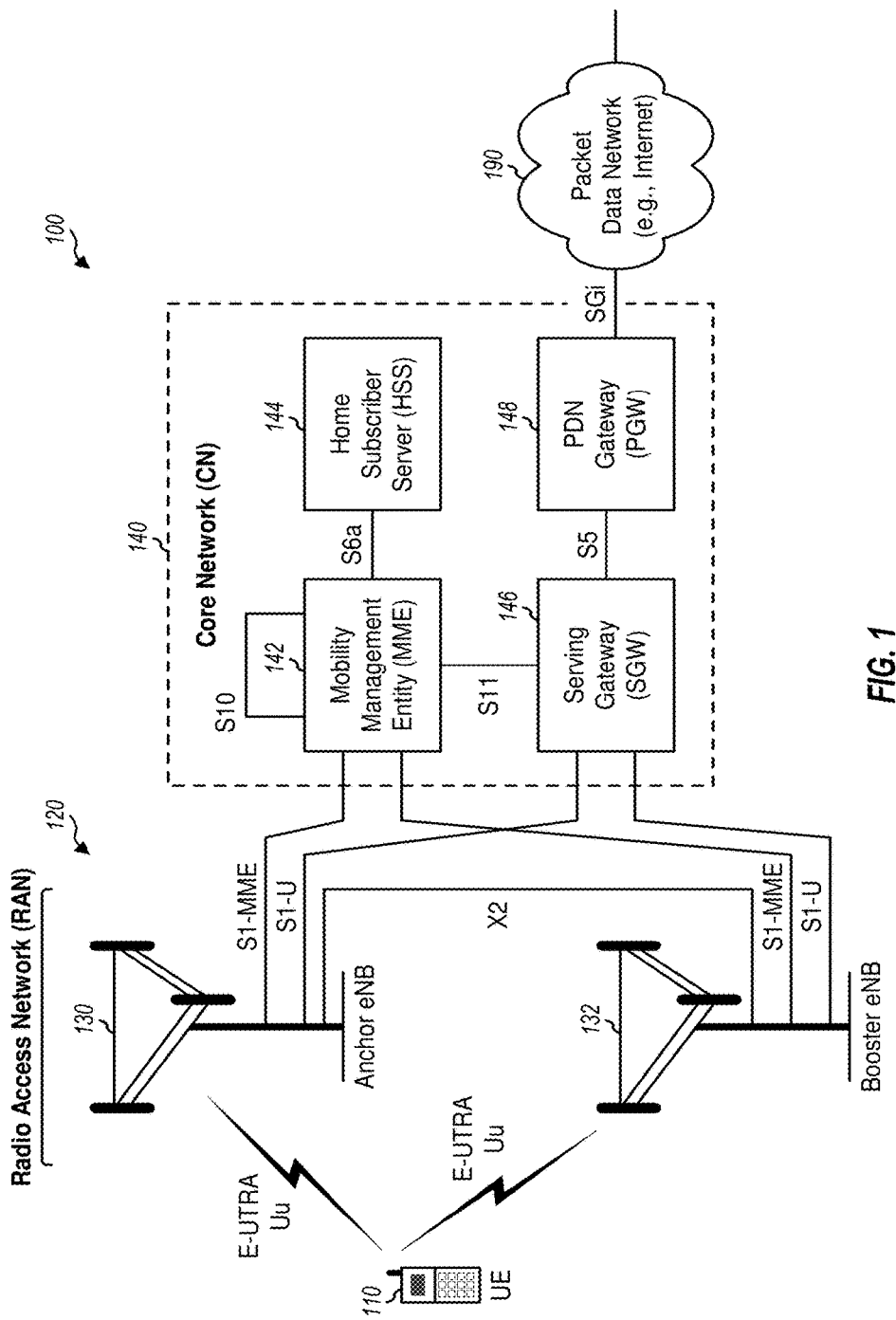
FIG. 1 is a block diagram illustrating a wireless communication network, which may be an LTE network or some other wireless network.

FIG. 1 shows a wireless communication network 100, which may be an LTE network or some other wireless network. Wireless network 100 may include a radio access network (RAN) 120 that supports radio communication and a core network (CN) 140 that supports data communication and/or other services. RAN 120 may also be referred to as an Evolved Universal Terrestrial Radio Access Network (E-UTRAN).

RAN 120 may include a number of evolved Node Bs (eNBs) that support radio communication for UEs. For simplicity, only two eNBs 130 and 132 are shown in FIG. 1. An eNB may be an entity that communicates with the UEs and may also be referred to as a Node B, a base station, an access point, etc. Each eNB may provide communication coverage for a particular geographic area and may support radio communication for the UEs located within the coverage area. To improve network capacity, the overall coverage area of an eNB may be partitioned into multiple (e.g., three) smaller areas. Each smaller area may be served by a respective eNB subsystem. In 3GPP, the term "cell" can refer to a coverage area of an eNB and/or an eNB subsystem serving this coverage area. RAN 120 may also include other network entities that are not shown in FIG. 1 for simplicity.

Core network 140 may include a Mobility Management Entity (MME) 142, a Home Subscriber Server (HSS) 144, a serving gateway (SGW) 146, and a Packet Data Network (PDN) gateway (PGW) 148. Core network 140 may also include other network entities that are not shown in FIG. 1 for simplicity.

MME 142 may perform various functions such as control of signaling and security for a Non Access Stratum (NAS), authentication and mobility management of UEs, selection of gateways for UEs, bearer management functions, etc. HSS 144 may store subscription-related information (e.g., user profiles) and location information for users, perform authentication and authorization of users, and provide information about user location and routing information when requested.

Serving gateway 146 may perform various functions related to Internet Protocol (IP) data transfer for UEs such as data routing and forwarding, mobility mastering, etc. Serving gateway 146 may also terminate the interface towards RAN 120 and may perform various functions such as support for handover between eNBs, buffering, routing and forwarding of data for UEs, initiation of network-triggered service request procedure, accounting functions for charging, etc.

PDN gateway 148 may perform various functions such as maintenance of data connectivity for UEs, IP address allocation, packet filtering for UEs, service level gating control and rate enforcement, dynamic host configuration protocol (DHCP) functions for clients and servers, gateway GPRS support node (GGSN) functionality, etc. PDN gateway 148 may also terminate a SGi interface toward a packet data network 190, which may be the Internet, a packet data network of a network operator, etc. SGi is a reference point between a PDN gateway and a packet data network for provision of data services.

FIG. 1 also shows exemplary interfaces between various network entities in RAN 120 and core network 140. eNBs 130 and 132 may communicate with each other via an X2 interface. eNBs 130 and 132 may communicate with MME 142 via an S1-MME interface and with serving gateway 146 via an S1-U interface. MME 142 may communicate with HSS 144 via an S6a interface and may communicate with serving gateway 146 via an S11 interface. Serving gateway 146 may communicate with PDN gateway 148 via an S5 interface.

The various network entities in RAN 120 and core network 140 and the interfaces between the network entities are described in 3GPP TS 36.300, entitled "Evolved Universal Terrestrial Radio Access (E-UTRA) and Evolved Universal Terrestrial Radio Access Network (E-UTRAN); Overall description," and in 3GPP TS 23.401, entitled "General Packet Radio Service (GPRS) enhancements for Evolved Universal Terrestrial Radio Access Network (E-UTRAN) access." These documents are publicly available from 3GPP.

A UE 110 may communicate with one or more eNBs at any given moment for radio communication. UE 110 may be stationary or mobile and may also be referred to as a mobile station, a terminal, an access terminal, a subscriber unit, a station, etc. UE 110 may be a cellular phone, a smartphone, a tablet, a wireless communication device, a personal digital assistant (PDA), a wireless modem, a handheld device, a laptop computer, a cordless phone, a wireless local loop (WLL) station, a netbook, a smartbook, etc.

Wireless network 100 may support operation on multiple carriers, which may be referred to as carrier aggregation or multi-carrier operation. UE 110 may be configured with multiple carriers for the downlink and one or more carriers for the uplink for carrier aggregation. One or more eNBs may transmit data and/or control information on one or more carriers to UE 110. UE 110 may transmit data and/or control information on one or more carriers to one or more eNBs.

Wireless network 100 may support communication via a user plane and a control plane. A user plane is a mechanism for carrying data for higher-layer applications and employing a user-plane bearer, which is typically implemented with standard protocols such as User Datagram Protocol (UDP), Transmission Control Protocol (TCP), and Internet Protocol (IP). A control plane is a mechanism for carrying data (e.g., signaling) and is typically implemented with network-specific protocols, interfaces, and signaling messages such as Non Access Stratum (NAS) messages and Radio Resource Control (RRC) messages. For example, traffic/packet data may be sent between UE 110 and wireless network 100 via the user plane. Signaling for various procedures to support communication for UE 110 may be sent via the control plane.

UE 110 may be configured with multiple data bearers for data communication with carrier aggregation. A bearer may refer to an information transmission path of defined characteristics, e.g., capacity, delay, bit error rate, etc. A data bearer is a bearer for exchanging data and may terminate at a UE and a network entity (e.g., a PDN gateway) designated to route data for the UE. A data bearer may also be referred to as an Evolved Packet System (EPS) bearer in LTE, etc. A data bearer may be established when UE 110 connects to a designated network entity (e.g., a PDN gateway) and may remain established throughout the lifetime of the connection in order to provide UE 110 with always-on IP connectivity. This data bearer may be referred to as a default data bearer. One or more additional data bearers may be established to the same network entity (e.g., the same PDN gateway) and may be referred to as dedicated data bearer(s). Each additional data bearer may be associated with various characteristics such as (i) one or more traffic flow templates (TFTs) used to filter packets to be sent via the data bearer, (ii) quality-of-service (QoS) parameters for data transfer between the UE and the designated network entity, (iii) packet forwarding treatment related to scheduling policy, queue management policy, rate shaping policy, Radio Link Control (RLC) configuration, etc., and/or (iv) other characteristics. For example, UE 110 may be configured with one data bearer for transfer of data for a Voice-over-IP (VoIP) call, another data bearer for Internet download traffic, etc. In summary, a default data bearer may be established with each new data connection (e.g., each new PDN connection) and its context may remain established throughout the lifetime of the data connection. The default data bearer may be a non-guaranteed bit rate (GBR) bearer. A dedicated data bearer may be associated with uplink packet filters in a UE and downlink packet filters in a designated network (e.g., a PDN gateway), where the filters may only match certain packets. Each data bearer may correspond to a radio bearer. The default data bearer may typically be best effort and may carry all packets for an IP address that do not match the packet filters of any of the dedicated data bearers. The dedicated data bearers may typically be associated with traffic of a specific type (e.g., based on the packet filters) and may be associated with certain QoS.

In an aspect of the present disclosure, multiple data bearers may be configured for UE 110 for carrier aggregation and may be split among multiple eNBs, which may be referred to as bearer level splitting. eNBs may be selected to serve the multiple data bearers of UE 110 based on various criteria such as channel conditions, loading, etc. In one design, eNBs may be selected to serve data bearers of UE 110 on a per data bearer basis, so that a particular eNB may be selected to serve each data bearer of UE 110. Each data packet for UE 110 may be sent via an appropriate data bearer based on a TFT associated with each data bearer. Bearer level splitting may be supported in various manners and with various network architectures.

Figure 2:
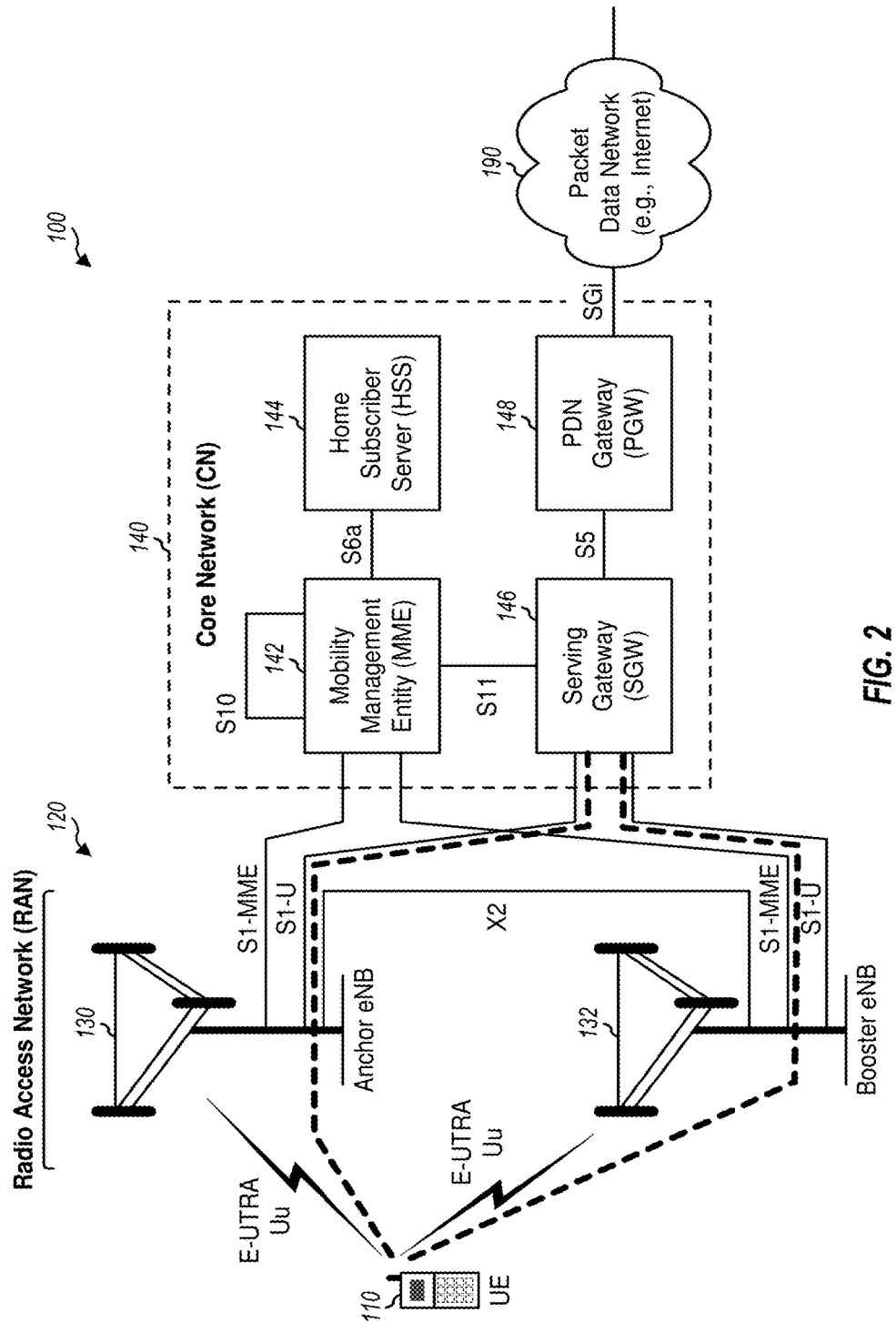
FIG. 2 is a block diagram illustrating an exemplary design of bearer level splitting with data bearers terminating at the core network.

FIG. 2 shows an exemplary design of bearer level splitting with data bearers terminating at core network 140. UE 110 may communicate with multiple eNBs 130 and 132 for carrier aggregation. eNB 130 may be an master eNB for UE 110, and eNB 132 may be a secondary eNB for UE 110. A master eNB may be an eNB designated to control communication for a UE. A master eNB may also be referred to as a serving eNB, a primary eNB, a main eNB, an anchor eNB, or other terminology. A secondary eNB may be an eNB selected to exchange data with a UE, e.g., transmit data to and/or receive data from the UE. A secondary eNB may also be referred to as a booster eNB, a supplemental eNB, or other terminology.

UE 110 may be configured with multiple data bearers for carrier aggregation. At least one of the multiple data bearers may be served by master eNB 130, and remaining ones of the multiple data bearers may be served by secondary eNB 132. Each data bearer of UE 110 may thus be served by one eNB for UE 110. MME 142 may manage the data bearers of UE 110 and may determine which data bearers of UE 110 are served by which eNBs, e.g., using methods defined in LTE Release 8, except that the tunnel endpoints for the data bearers are now at different eNBs instead of a single eNB. MME 142 may send Modify Bearer Request messages to affected network entities (e.g., serving gateway 146) to change eNBs serving the data bearers of UE 110.

For data transmission on the downlink, PDN gateway 148 may receive data intended for UE 110 and may separate the data into different data bearers of UE 110. PDN gateway 148 may forward the data for UE 110 to serving gateway 146, which may forward the data to appropriate eNBs based on a Modify Bearer Request message from MME 142.

For data transmission on the uplink, each eNB may receive data from UE 110 and may forward the data to serving gateway 146 via an appropriate data bearer. Serving gateway 146 may forward the data for all data bearers of UE 110 to PDN gateway 148.

For bearer level splitting with data bearers terminating at core network 140, no changes may be needed to serving gateway 146 or PDN gateway 148. MME 142 may be modified for a new type of Path Switch Request (e.g., a Bearer Switch Request), which may impact only a portion of the data bearers of UE 110.

Figure 3:
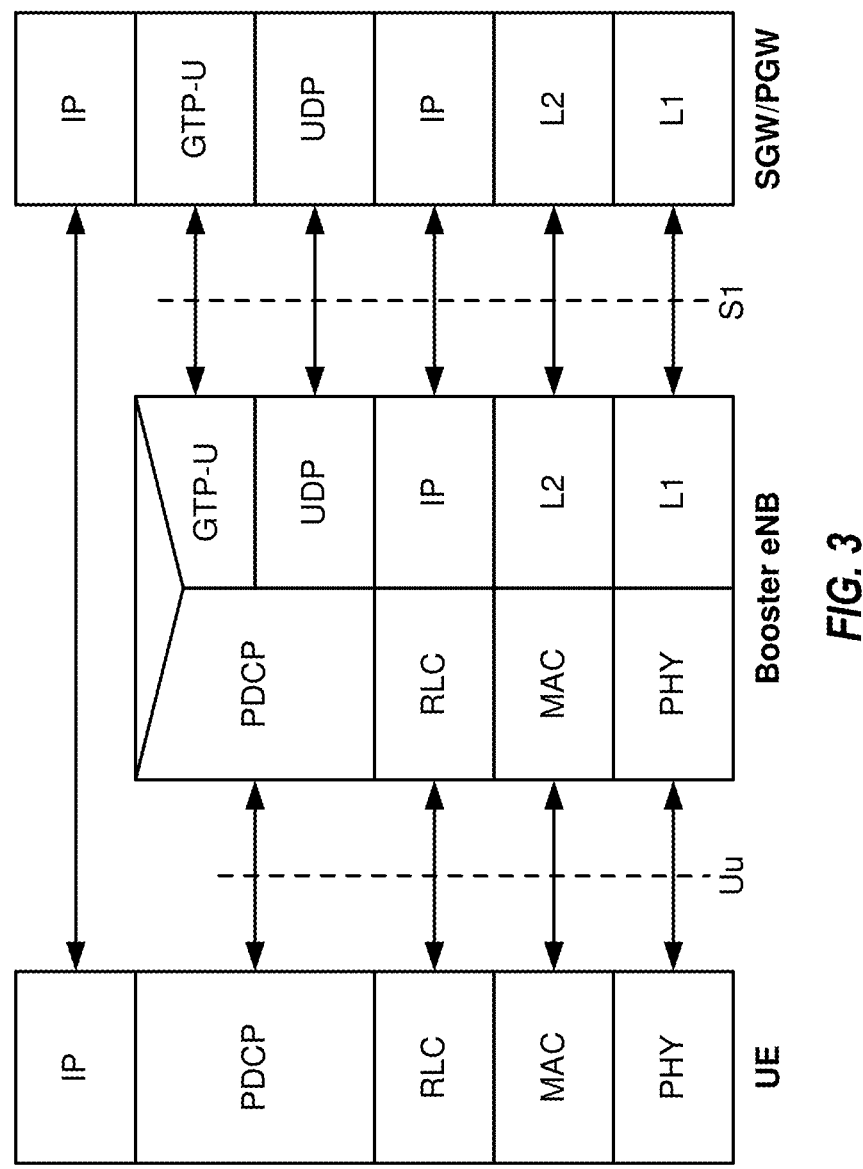
FIG. 3 is a block diagram illustrating exemplary protocol stacks for the user plane for communication between a UE and a PDN gateway based on the network architecture shown in FIG. 2.

FIG. 3 shows exemplary protocol stacks for the user plane for communication between UE 110 and PDN gateway 148 based on the network architecture shown in FIG. 2. UE 110 may exchange (e.g., transmit and/or receive) data with PDN gateway 148 via IP. At UE 110, IP may operate over (i) Packet Data Convergence Protocol (PDCP), Radio Link Control (RLC), and Medium Access Control (MAC) in Layer 2 (L2) and (ii) E-UTRA air-link in physical layer (PHY)/Layer 1 (L1). Secondary eNB 132 may communicate with serving gateway 146 via GPRS Tunneling Protocol for User Plane (GTP-U), UDP, IP, L2 and L1.

The user plane for UE 110 via secondary eNB 132 in FIG. 3 may be similar to the user plane for UE 110 via a conventional eNB in LTE Release 8. The user plane for UE 110 via master eNB 130 may be similar to the user plane for UE 110 via secondary eNB 132.

Figure 4:
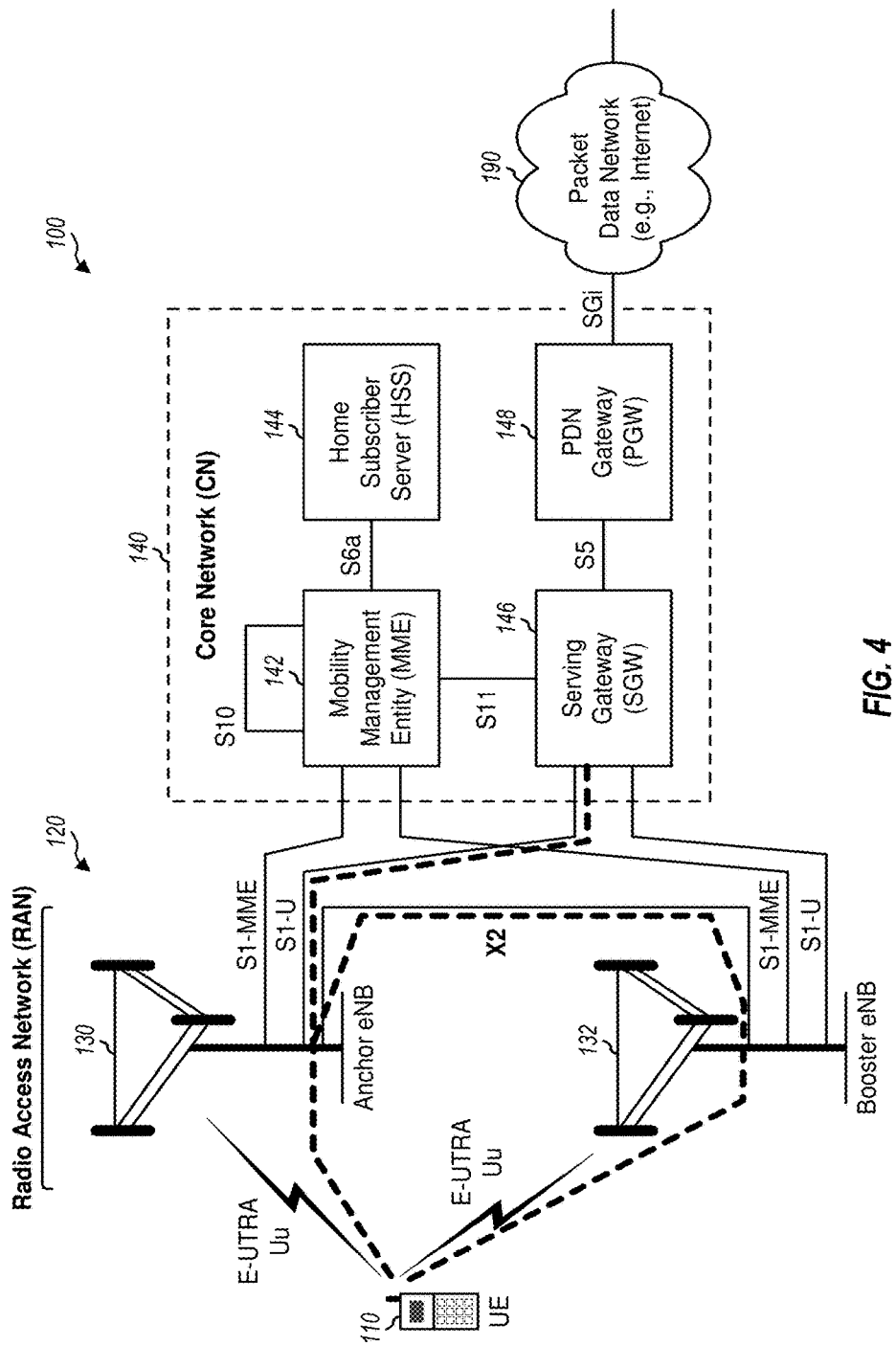
FIG. 4 is a block diagram illustrating an exemplary design of bearer level splitting with data bearers terminating at the RAN.

FIG. 4 shows an exemplary design of bearer level splitting with data bearers terminating at RAN 120. UE 110 may communicate with multiple eNBs 130 and 132 for carrier aggregation and may be configured with multiple data bearers for carrier aggregation. At least one of the multiple data bearers may be served by master eNB 130, and remaining ones of the multiple data bearers may be served by secondary eNB 132. Master eNB 130 may act as an master for the data plane aggregating data of UE 110 sent via secondary eNB 132. In one design, PDCP may terminate at secondary eNB 132. A single S1 interface between master eNB 130 and serving gateway 146 may be used for all data bearers of UE 110. The mapping of data bearers to eNBs may be hidden from core network 140, which may operate in the same manner as if all data bearers of UE 110 are served by only eNB 130. For bearer level splitting with data bearers terminating at the RAN, no changes may be needed for network entities in the core network since mobility to and from secondary eNBs may be hidden from the core network.

For data transmission on the downlink, PDN gateway 148 may receive data intended for UE 110 and may separate the data into different data bearers of UE 110. PDN gateway 148 may forward the data for UE 110 to serving gateway 146, which may forward the data to master eNB 130. Master eNB 130 may identify and separate data for data bearers of UE 110 served by master eNB 130 and data for data bearers of UE 110 served by secondary eNB 132. Master eNB 130 may forward the data for the data bearers served by secondary eNB 132 to the secondary eNB via X2-U interface. For data transmission on the downlink, the operation performed by master eNB 130 may be similar to operations performed by an eNB for handover of UE 110 to secondary eNB 132. However, for bearer level splitting, master eNB 130 may continue to forward data for UE 110 to secondary eNB 132 for the duration of the connection of UE 110 at secondary eNB 132.

For data transmission on the uplink, master eNB 130 may receive data sent by UE 110 via data bearers served by master eNB 130. Secondary eNB 132 may receive data sent by UE 110 via the data bearers served by secondary eNB 132 and may forward the data to master eNB 130 via the X2-U interface.

Figure 5:
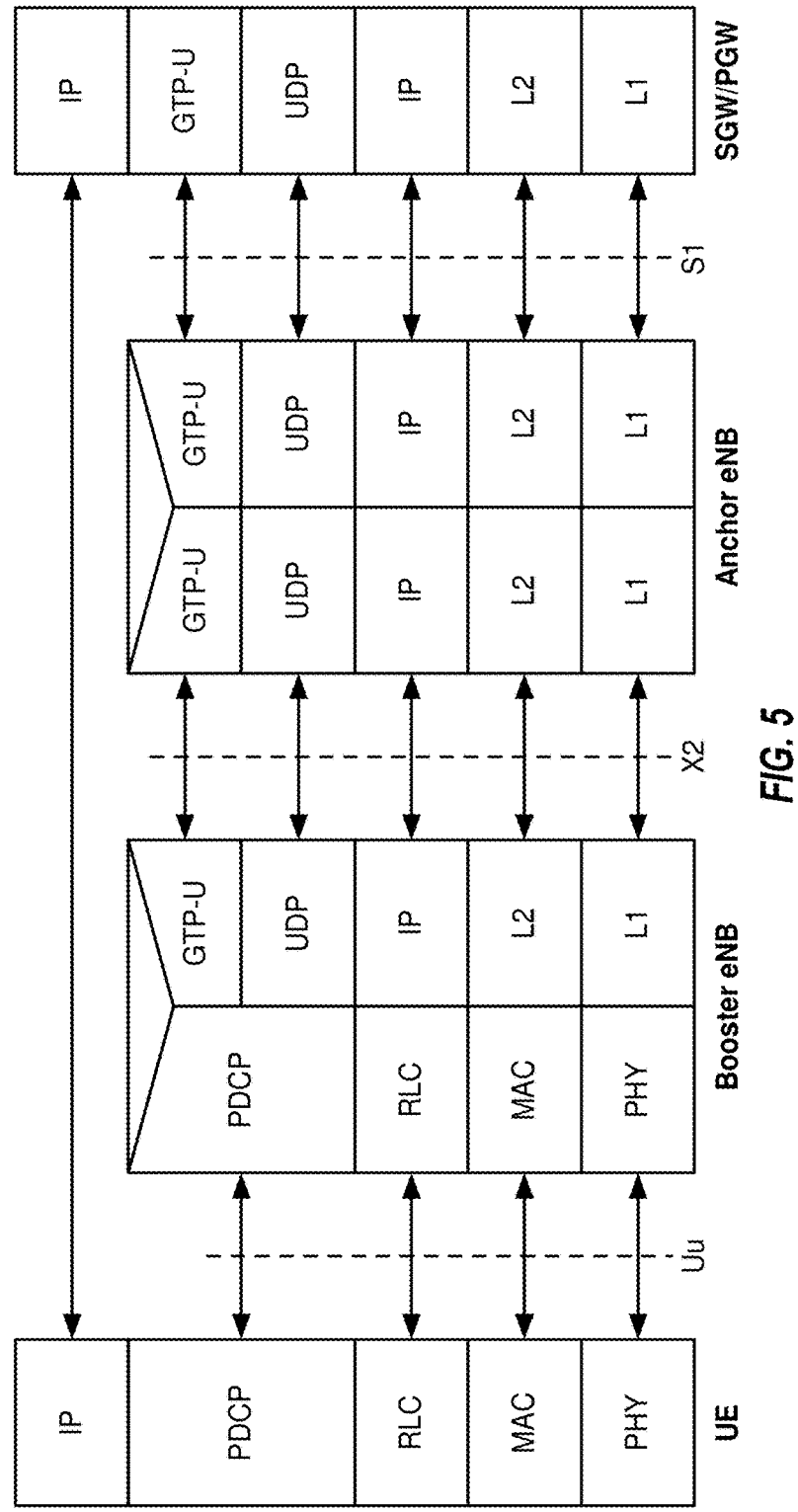
FIG. 5 is a block diagram illustrating exemplary protocol stacks for the user plane for communication between a UE and a PDN gateway via different eNBs based on the network architecture shown in FIG. 4.

FIG. 5 shows exemplary protocol stacks for the user plane for communication between UE 110 and PDN gateway 148 via eNBs 130 and 132 based on the network architecture shown in FIG. 4. UE 110 may exchange data with PDN gateway 148 via IP. At UE 110, IP may operate over PDCP, RLC, MAC, and PHY. Secondary eNB 132 may communicate with master eNB 130 via GTP-U, UDP, IP, L2 and L1. Similarly, master eNB 130 may communicate with serving gateway 146 via GTP-U, UDP, IP, L2 and L1.

The user plane for UE 110 via master eNB 130 may be similar to the user plane for UE 110 via secondary eNB 132 in FIG. 3, which may be similar to the user plane for UE 110 via a conventional eNB in LTE Release 8. The user plane for UE 110 via master eNB 130 may be the same as the user plane for UE 110 via secondary eNB 132. On the downlink, the user plane for UE 110 via secondary eNB 132 may be similar to the user plane for UE 110 via a conventional eNB in LTE Release 8 for data packets sent to master eNB 130 that are forwarded to secondary eNB 132.

Figure 6:
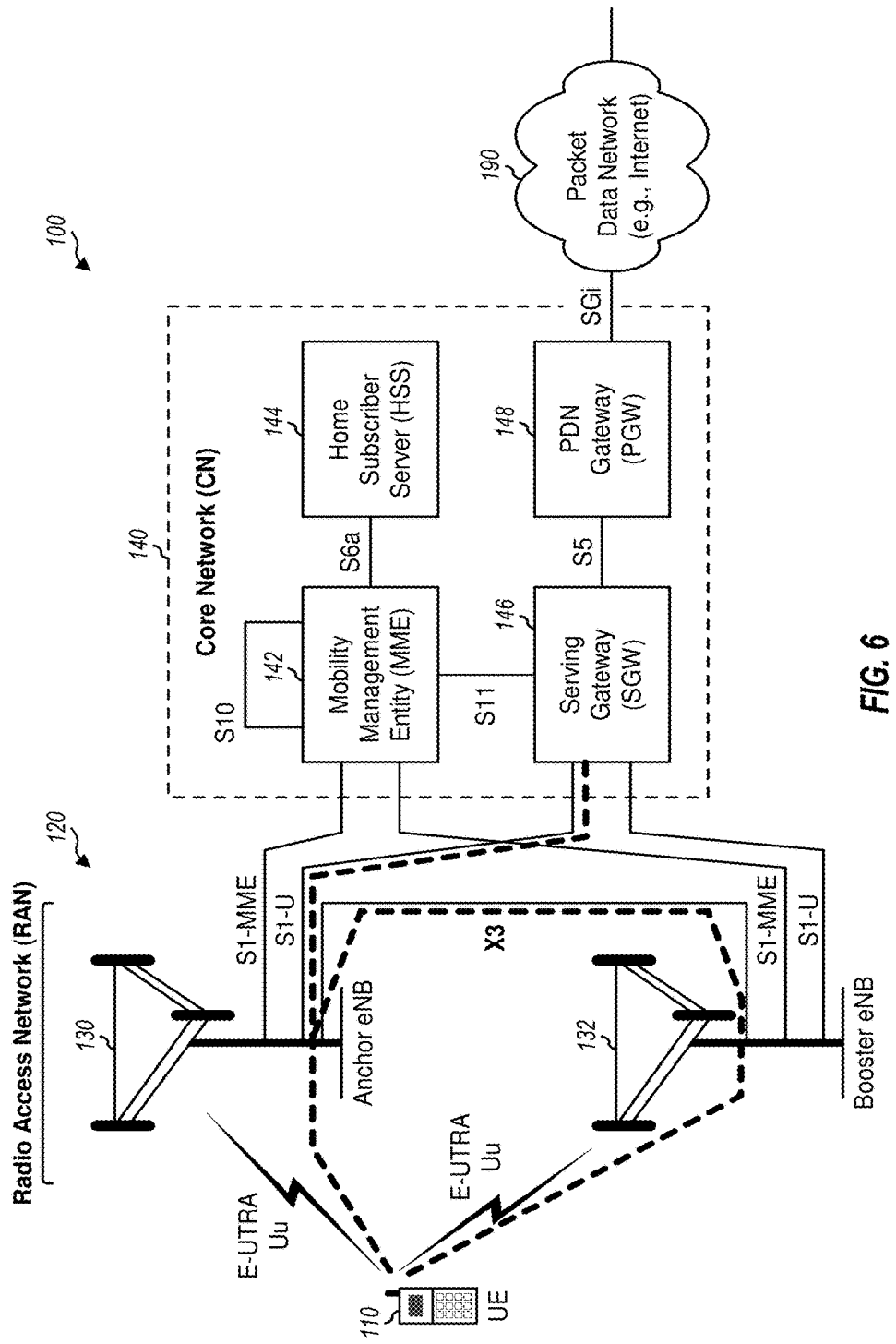
FIG. 6 is a block diagram illustrating an exemplary design of bearer level splitting with data bearers terminating at the RAN.

FIG. 6 shows an exemplary design of bearer level splitting with data bearers terminating at RAN 120. The design in FIG. 6 is similar to the design in FIG. 4, except that PDCP is terminated at master eNB 130 in FIG. 6 (instead of at secondary eNB 132 in FIG. 4). Secondary eNB 132 may be considered as a cell with regard to UE 110 since it does not terminate PDCP for UE 110 and is not a full eNB to UE 110.

For data transmission on the downlink, PDN gateway 148 may receive data intended for UE 110 and may separate the data into different data bearers of UE 110. PDN gateway 148 may forward the data for UE 110 to serving gateway 146, which may forward the data to master eNB 130. Master eNB 130 may identify and separate data for data bearers served by master eNB 130 and data for offloaded data bearers served by secondary eNB 132. Master eNB 130 may process data for the offloaded data bearers for PDCP and may send the processed data to secondary eNB 132 via an X3-U interface. For data transmission on the uplink, secondary eNB 132 may receive data sent by UE 110 on the offloaded data bearers and may forward the data to master eNB 130 via the X3-U interface. X3-U may be a new data plane interface between master eNB 130 and secondary eNB 132 and may carry PDCP protocol data units (PDUs) on the uplink and downlink over GTP For bearer level splitting with data bearers terminating at RAN 120 with PDCP terminated at master eNB 130, security for the Uu interface for connecting the the UE 110 to master eNB 130 may be terminated at master eNB 130. Radio Resource Control (RRC) may be terminated at master eNB 130. In case of handover of UE 110 to another eNB, buffered data for PDCP may be available at master eNB 130.

Figure 7:
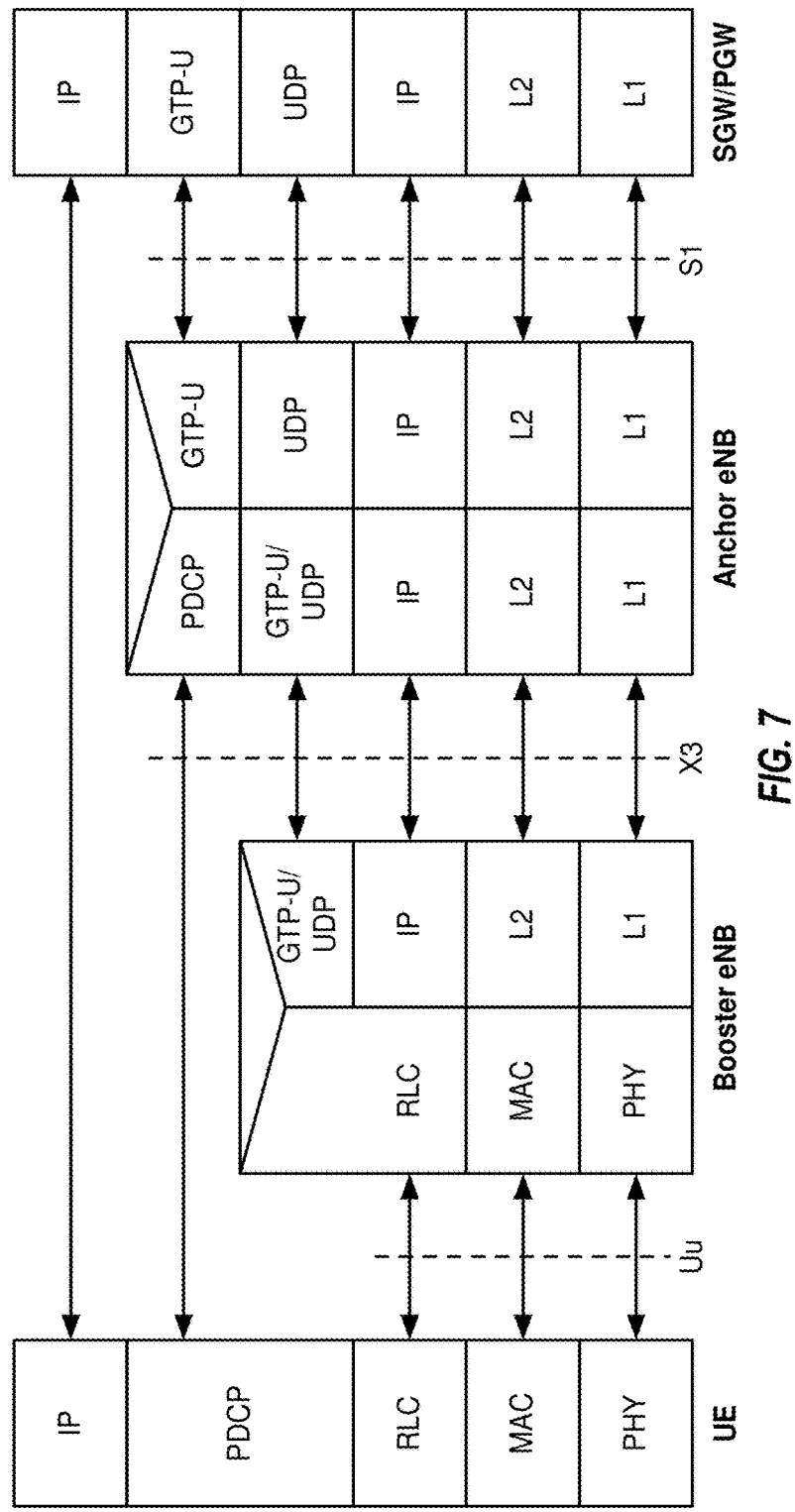
FIG. 7 is a block diagram illustrating exemplary protocol stacks for the user plane for communication between a UE and a PDN gateway 48 via different eNBs based on the network architecture shown in FIG. 6.

FIG. 7 shows exemplary protocol stacks for the user plane for communication between UE 110 and PDN gateway 148 via eNBs 130 and 132 based on the network architecture shown in FIG. 6. UE 110 may exchange data with PDN gateway 148 via IP. At UE 110, IP may operate over PDCP, RLC, MAC, and PHY. PDCP may terminate at master eNB 130 whereas RLC, MAC, and PHY may terminate at secondary eNB 132. Secondary eNB 132 may communicate with master eNB 130 via GTP-U, IP, L2 and L1. Master eNB 130 may communicate with serving gateway 146 via GTP-U, UDP, IP, L2 and L1. The user plane for UE 110 via master eNB 130 may be the same as the user plane for UE 110 via secondary eNB 132 in FIG. 3, which may be similar to the user plane for UE 110 via a conventional eNB in LTE Release 8.

Figure 8:
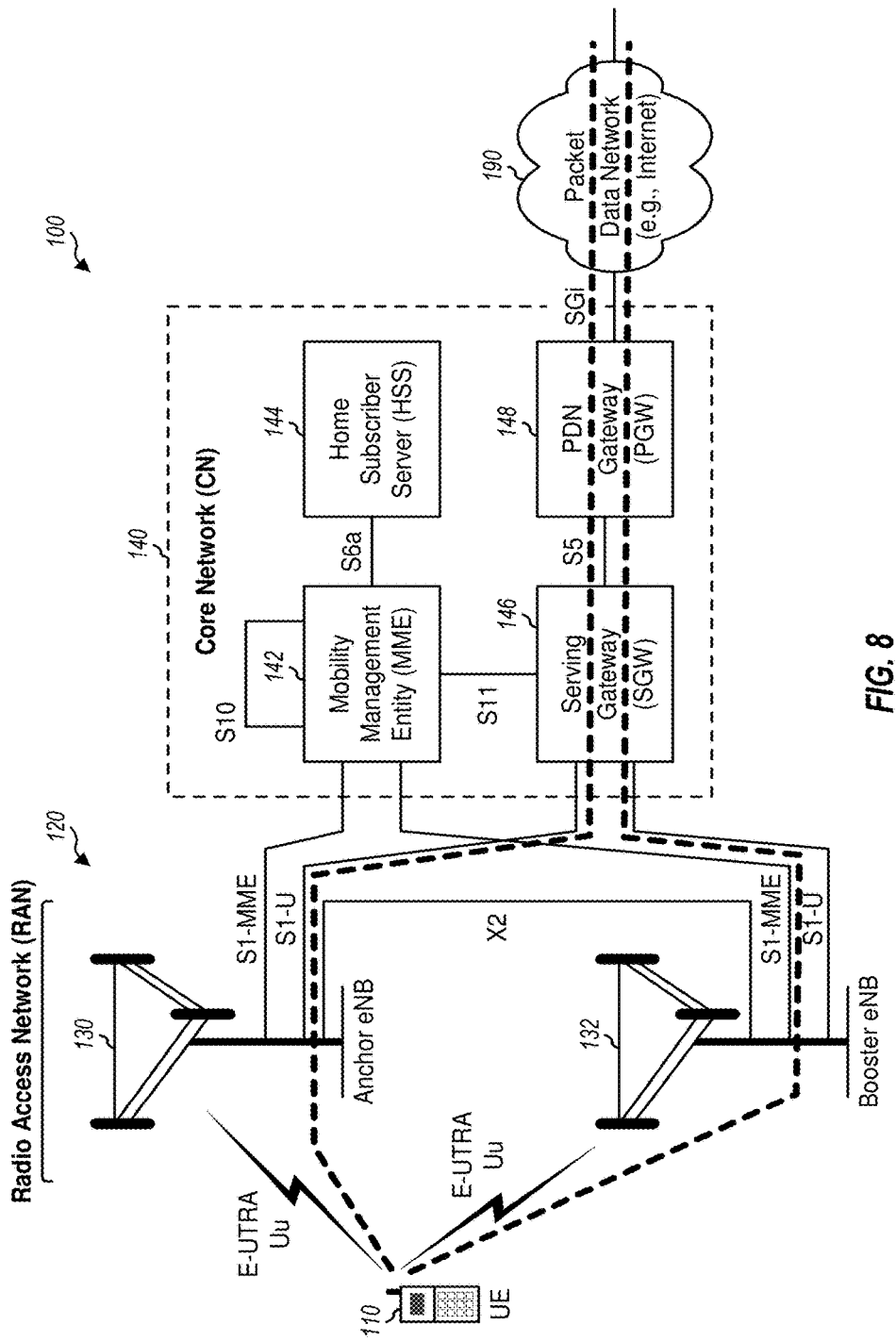
FIG. 8 is a block diagram an exemplary design of bearer level splitting with separate data connections in the core network.

FIG. 8 shows an exemplary design of bearer level splitting with separate data connections in core network 140. A data connection is a data path between two entities exchanging data. A data connection may also be referred to as a PDN connection, etc. A data connection may be associated with various characteristics such as an IP address used to send data to an entity terminating the data connection. The IP address may correspond to a packet data network (PDN) requested by a UE for a type of access. For example, the UE may request an Access Point Name (APN) that corresponds to a type of access such as Internet, voice, operator services, local breakout, etc. Based on the name, an MME may select a PDN that can provide the type of access requested by the UE and then, through a series of procedures defined in TS 23.401, the UE may be assigned an IP address corresponding to that PDN. The PDN may then have one or more associated data bearers so the UE can perform QoS for traffic related to that PDN.

Bearer level splitting with separate data connections may be used to support multipath TCP. TCP typically assumes in-order delivery of data. If a UE sends packets using multiple IP addresses (e.g., for WLAN interface and cellular), then a mechanism is needed to (a) support a TPC client having multiple interfaces and (b) deal with packet loss separately on each interface. Multipath TCP is a method of TCP defined by IETF which allows a TCP client to have multiple IP addresses with respect to a TCP server.

In one design of bearer level splitting with separate data connections, the data bearers of UE 110 for each eNB may correspond to a separate data connection at PDN gateway 148. For example, data bearers of UE 110 served by master eNB 130 may correspond to a first data connection associated with a first IP address assigned to UE 110, and data bearers of UE 110 served by secondary eNB 132 may correspond to a second data connection associated with a second IP address assigned to UE 110. In contrast, for the design in FIG. 2, all data bearers of UE 110 may correspond to a single data connection at PDN gateway 148.

In one design, a common serving gateway may be used (depending on the control plane) for all data connections of UE 110. This design may simplify bearer management for each data connection as data bearers are activated, de-activated, and/or changed. In another design, different serving gateways may be used for different data connections of UE 110.

In one design, a single PDN gateway may terminate all data connections of UE 110, e.g., as shown in FIG. 8. In another design, different PDN gateways may terminate different data connections of UE 110 since (i) UE 110 may be assigned a separate IP address at each eNB and (ii) the data connections for UE 110 may be independent in the data plane.

Table 1 summarizes various characteristics of bearer level splitting for the three exemplary designs shown in FIGS. 2, 4 and 6.

TABLE 1

Bearer Level Splitting

| Evaluation criteria | Data bearers terminated at core network | Data bearers terminated at RAN via X2 - PDCP terminated at secondary eNB | Data bearers terminated at RAN via X3 - PDCP terminated at master eNB |
|---|---|---|---|
| Impact to core network | MME is updated to handle per bearer handover. No changes to PGW/SGW. | None | None |
| Master eNB data plane functions | Normal eNB functions for data bearers served by master eNB. | Normal eNB functions for served data bearers. Forward data for offloaded data bearers via X2 to secondary eNB. Received data via X2 from secondary eNB and forward to SGW. | New X3 interface with secondary eNB. Forward data for offloaded data bearers via X3 to secondary eNB. Received data via X3 from secondary eNB and forward to SGW. |
| Secondary eNB data plane functions | Normal eNB functions for data bearers served by secondary eNB. | Receive downlink data for offloaded data bearers from master eNB via X2. Forward uplink data for offloaded data bearers to master eNB via X2. | Receive downlink data for offloaded data bearers from master eNB via X3. Forward uplink data for offloaded data bearers to master eNB via X3. |
| Master - secondary interface | Control plane plus initial X2-U forwarding from master eNB as part of bearer establishment at secondary eNB. | Control plane plus X2-U forwarding from master eNB for duration of offloaded data bearers served at secondary eNB. | Control plane plus X3 forwarding from master eNB for duration of offloaded data bearers served at secondary eNB. |
| Routing efficiency | Good routing efficiency on downlink and uplink | Routing efficiency is dependent on routing path between master | Routing efficiency is dependent on routing path between master |

TABLE 1-continued

Bearer Level Splitting

| Evaluation criteria | Data bearers terminated at core network | Data bearers terminated at RAN via X2 - PDCP terminated at secondary eNB | Data bearers terminated at RAN via X3 - PDCP terminated at master eNB |
| --- | --- | --- | --- |
| | as packets are sent directly to SGW. | eNB and secondary eNB. Routing bottleneck, if present, will be at master eNB and not secondary eNB. | eNB and secondary eNB. Routing bottleneck, if present, will be at master eNB and not secondary eNB. |
| Security | Common or independent security for each eNB. Master eNB is aware of security keys for secondary eNB. CN may be updated to support independent security for more than one secondary eNB. | Common or independent security for master eNB and set of secondary eNBs. Master eNB is aware of security keys for secondary eNB. | All security at master eNB. Encrypted data sent on data plane between master eNB and UE via secondary eNB. Better if secondary eNB is not trusted. |
| Coexistence between standalone flow and multi-flow at secondary eNB | Low complexity. Common data plane - no difference between UE being served by standalone eNB or secondary eNB. | Medium complexity. Mostly common data plane - UE being served as standalone eNB is sent in S1-U vs. UE being served as secondary eNB is sent in X2-U but both are via same GTP protocol. | Higher complexity. Separate data plane - UE being served as standalone eNB is sent in S1-U vs. UE being served as secondary eNB would forward data packets to master eNB for PDCP. |

Data bearers may be terminated at the core network or the RAN, and this choice may be selected based on various criteria such as routing efficiency, impact to the core network, etc. Routing efficiency may also be dependent on how the master eNB and secondary eNBs are connected in an actual deployment. PDCP may be terminated in the master eNB or the secondary eNB, and this choice may be selected based on various factors such as whether security and RRC are terminated at the master eNB or the secondary eNB.

UE 110 may communicate with multiple eNBs for carrier aggregation, e.g., as shown in FIGS. 1, 2, 4, 6 and 8. From the perspective of UE 110, each eNB that serves data bearers of UE 110 may be considered as a cell. One cell may be designated as a primary cell (Pcell) for UE 110, and each remaining cell may be considered as a secondary cell (Scell) for UE 110. LTE Release 10 supports carrier aggregation from one or more cells in the same eNB, and coordination among all cells serving UE 110 for carrier aggregation may be possible due to the cells being collocated at the same eNB.

Multiple data bearers may be configured for UE 110 for carrier aggregation and may be referred to as bearer level aggregation. Bearer level aggregation may be combined with carrier aggregation of cells in the same eNB defined in LTE Release 10. In particular, UE 110 may be served by multiple cells for carrier aggregation, which may include (i) a first subset of cells in the same eNB and (ii) a second subset of cells non-collocated with the first subset of cells (and possibly utilizing a different radio access technology) at a different eNB. The first subset of cells may conform to carrier aggregation rules defined in LTE Release 10. Bearer level aggregation may be applied to the second subset of cells. The functionality of the multiple cells serving UE 110 may be disjoint at lower layers due to latency between eNBs to which these cells belong.

Several aspects of carrier aggregation in LTE Release 10 may be updated to enable independent cell operation for carrier aggregation. For transmission of control information on the uplink, hybrid automatic retransmission (HARQ) feedback and periodic channel state information (CSI) feedback from UE 110 may be transmitted to a single cell (e.g., the primary cell). Bearer level aggregation may support transmission of control information on the uplink to each cell, so that each cell may operate in similar manner as for single-carrier operation. UE 110 may be assigned multiple Physical Uplink Control Channels (PUCCHs) for transmission of control information on the uplink, e.g., one PUCCH for each cell. UE 110 may perform random access on only the primary cell, e.g., as defined in LTE Release 10. Alternatively, UE 110 may perform random access on the primary and secondary cells. UE 110 may be configured for discontinuous transmission (DTX) by multiple cells such that good performance can be obtained. A single MAC PDU may activate/deactivate multiple cells, e.g., as defined in LTE Release 10. Some coordination among cells may be established to enable multiple cells to be activated/deactivated by a single MAC PDU. Separate RLC may be used for each cell serving UE 110, which is different from a single RLC for all cells in LTE Release 10. Separate RRC may be used for each cell serving UE 110, which is different from a single RRC for all cells in LTE Release 10.

Dual Connectivity: The concept of "dual connectivity" operation as introduced in 3GPP and as used herein refers to operating circumstances wherein UE maintains simultaneous connections to a master eNB (MeNB) and secondary eNB (SeNB) via different bearers. Dual connectivity is defined by at least two architectures "1A" and "3C" as described in connection with FIGS. 12 and 13, respectively.

Challenges of dual connectivity that are addressed by the present disclosure include how to determine which SeNBs are allowed or permitted for dual connectivity. Determining whether a SeNB is permitted for dual connectivity may be done at either the MME or MeNB.

In addition, when dual connectivity is enabled in architecture 1A, the bearers are routed to two separate eNBs. In some scenarios, in order to enable dual connectivity the MME needs to perform Serving Gateway (SGW) relocation, e.g., if the SeNB is not routable by the current SGW or based on configuration. In this case the bearers for the SeNB and any remaining bearers on the MeNB need to be moved as well. The present disclosure also discloses options on how to perform this procedure or reject the dual connectivity when SGW relocation is required.

In some embodiments, the MeNB determines whether to establish dual connectivity at the SeNB. This approach, i.e., determination by the MeNB, may be applied both to architectures 1A and 3C as described connection with FIGS. 12 and 13, respectively. As shown in connection with FIGS. 14-15, for alternatives 1A and 3C the addition, modification and release of the SeNB and all the traffic routed to the SeNB may be done via X2 procedures. For example, for architecture 3C, the decision where to enable dual connectivity may be located at the MeNB only, since the MME is not involved. As such, the MeNB needs to manage the set of eligible SeNBs for dual connectivity for the UE since the procedures required to enable alternative 3C dual connectivity are transparent to the core network (CN).

Figure 22:
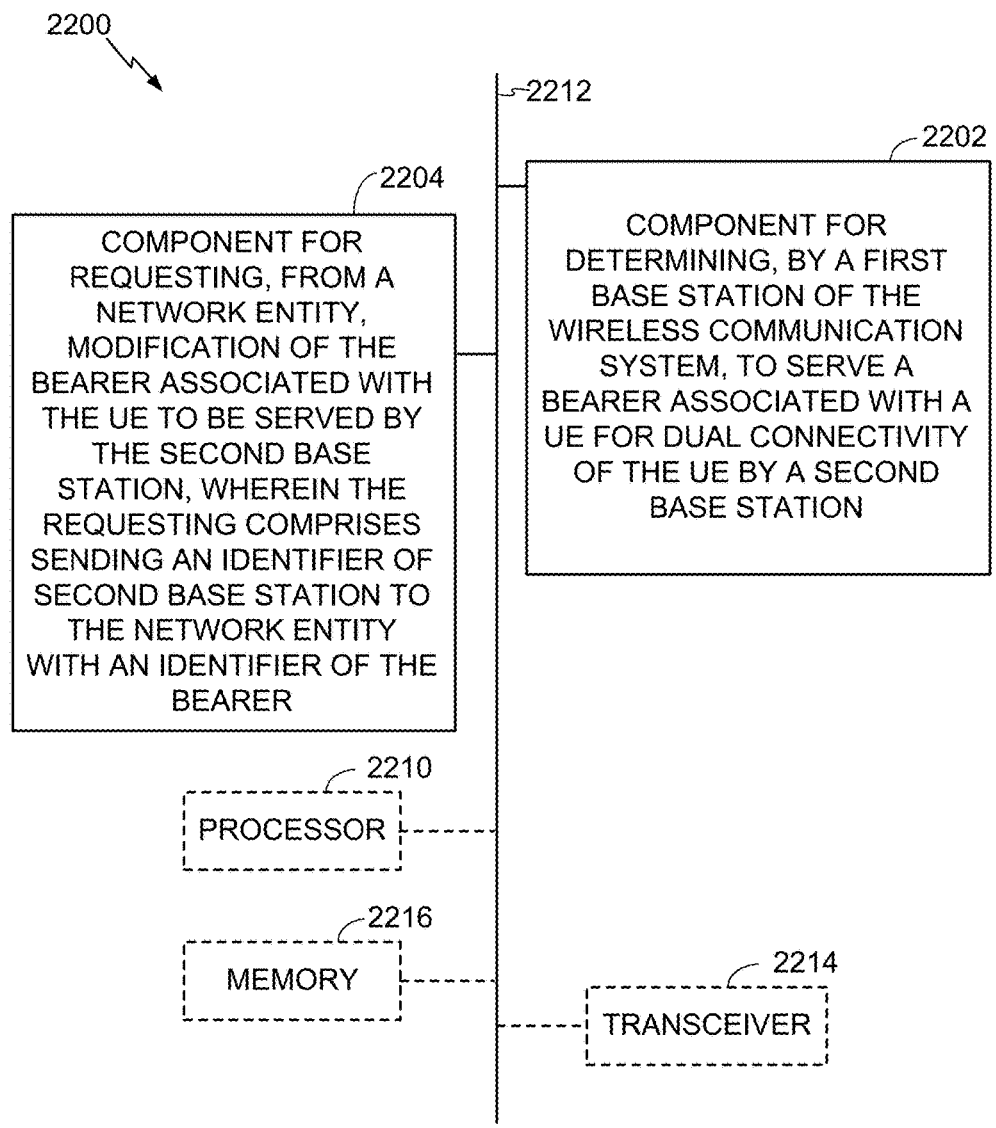

The following options may be used to manage which are the eligible SeNBs which can be used for dual connectivity, for all UEs or per UE:

For All UEs: (a) SeNB identifiers: in this case the MeNB may be configured with which SeNBs can be used based on a SeNB identifier, e.g., Tracking Area identifier (ID), eNB ID, Physical Layer Cell Identity (PCI), cell ID; (b) MeNB configuration: since X2 is required to enable dual connectivity, for each SeNB, the Neighbor relation table (for example, as shown in FIG. 22.3.2a-1 of 3GPP TS 36.300) may be configured via OAM as to whether dual connectivity procedures are allowed with that SeNB; (c) SeNB capabilities: the MeNB may exchange additional capabilities with the SeNB to determine whether dual connectivity is supported by the SeNB.

For Per UE: as part of the UE context, the MME may indicate whether the UE is eligible for dual connectivity, e.g., using a new IE or using the SPID; the indication may be a function of the UE capabilities.

In other embodiments, a core network entity (e.g., MME) may determine whether to establish dual connectivity at the SeNB. The MME determining whether to establish dual connectivity at the SeNB applies to architecture 1A as described in connection with FIG. 12. As shown in connection with FIGS. 14-15, for alternatives 1A the addition, modification and release of the SeNB and all the traffic routed to the SeNB is done via X2 procedures and also includes an S1 procedure. As such, the MME may be used to determine whether or not dual connectivity may be established at the SeNB for the UE.

Figure 14:
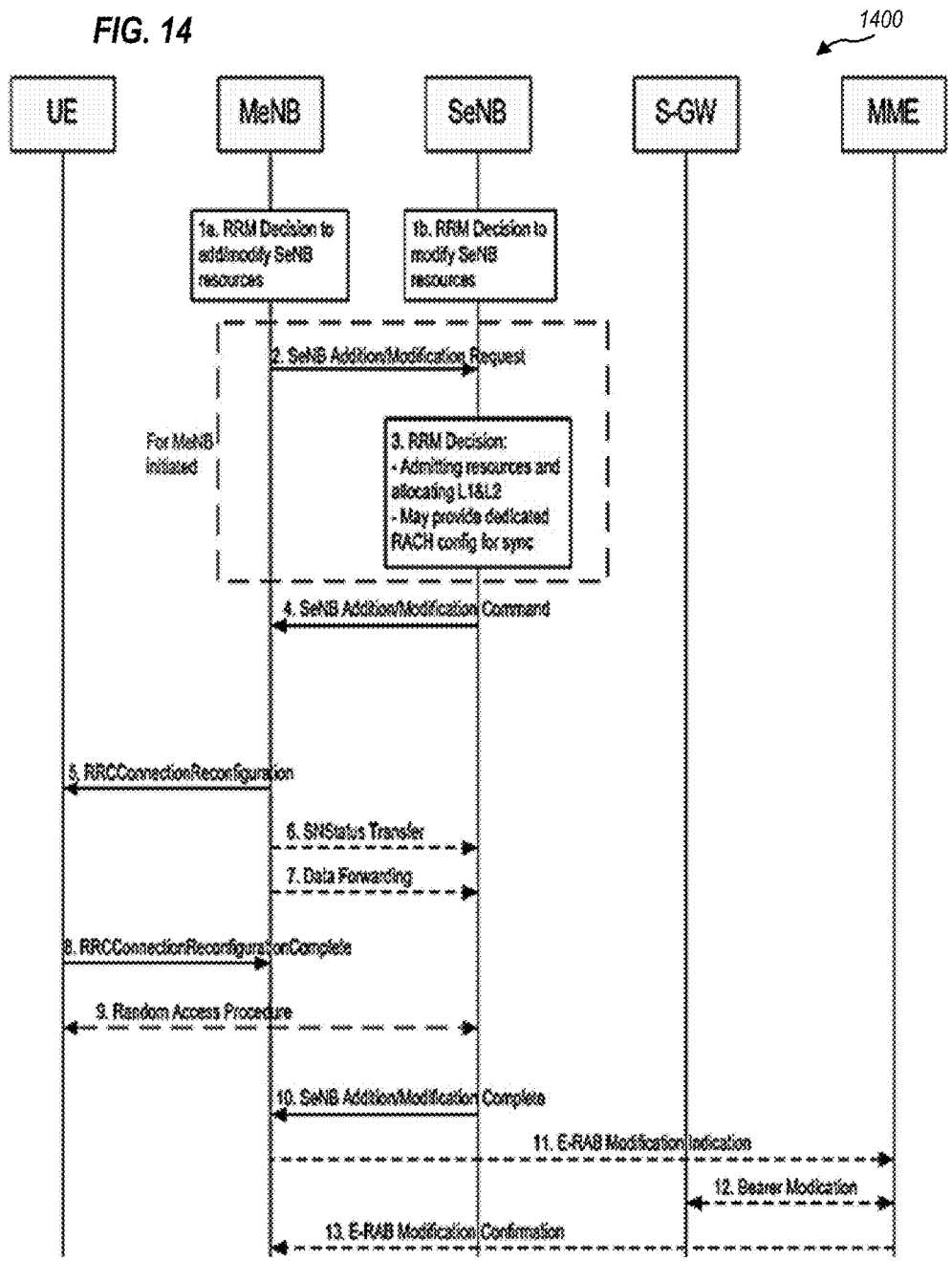
FIG. 14 is a call flow diagram illustrating a design of a call flow for taking back data bearers from a secondary eNB by a master eNB for data bearers terminated at the core network.
Figure 15:
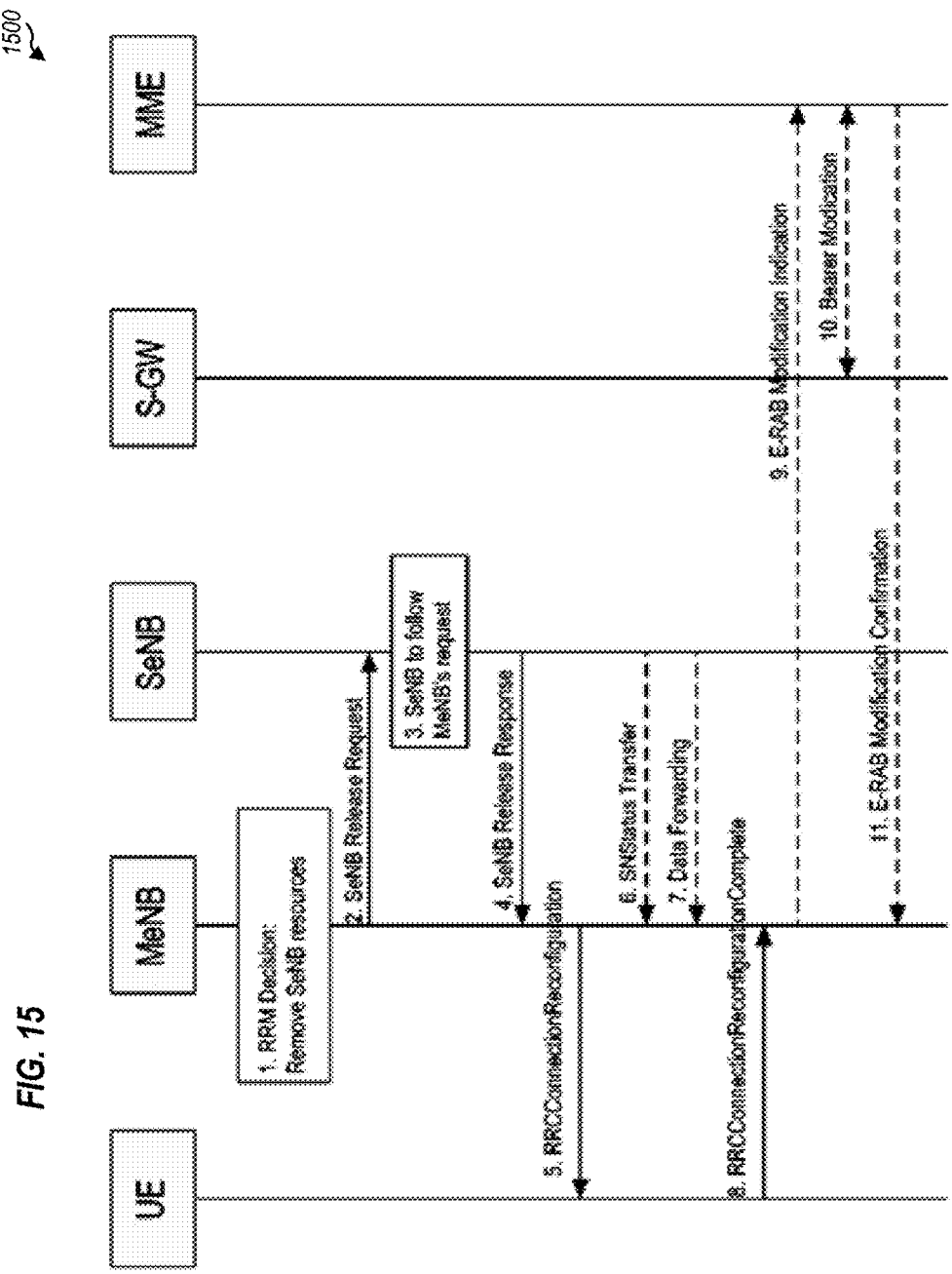
FIG. 15 is a call flow diagram illustrating a design of a call flow for adding data bearers at a secondary eNB.

As shown in FIGS. 14-15, for alternative 1A the addition and modification of the SeNB will require the S1-U tunnel(s) associated with the EPS bearers of the UE to be moved to and from an SeNB. As such, the procedures required to enable alternative 1A dual connectivity will require the modification of the S1-U tunnel endpoints and the corresponding S1-MME procedures to support this.

Currently, the modification of the S1-U tunnel comprises two procedures: (a) procedures for eNB to update the new tunnel endpoint with the MME, and (b) procedures for MME to update the new tunnel endpoint at the SGW. These are discussed in turn.

Figure 9:
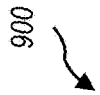
FIG. 9 is a table illustrating a path switch request that allows the IP address to be different for each bearer.

An example of procedures for eNB to inform the MME of the new tunnel endpoint involving moving the S1-U tunnel endpoints can be found in 3GPP TS 23.401 section 5.5.1.1. In this example, the path switch request is sent by a target SeNB to move the bearers from the source to the target SeNB after an X2 handover. FIG. 9 shows a data table 900 illustrating that, as described n 3GPP TS 36.413, section 9.1.5.8, the path switch request allows the IP address to be different for each bearer. As shown in FIG. 14, an analogous procedure to path switch request may be used by the MeNB to inform the MME of the new tunnel endpoint to enable dual connectivity. The analogous procedure is labeled "E-RAB modification indication" in step 11 of FIG. 14.

In other embodiments, there are procedures for an MME or similar network entity to update the new tunnel endpoint at the SGW. The MME currently moves the S1-U tunnel endpoint at the SGW using the Modify Bearer Request procedure as defined in 3GPP TS 29.274. The Modify Bearer Request message is "per bearer," and so the MME can move individual bearers to and from the SeNB as needed.

Accordingly, it should be possible to support dual connectivity without requiring changes to the SGW or S11 interface. However, several additional factors should be considered. For example, additional considerations for alternative 1A may include whether the dual connectivity can trigger SGW relocation analogous to SGW relocation for X2. Since some bearers may remain on the MeNB, such relocation may either require two SGWs for the UE which is not supported or moving all the bearers to the new SGW.

Figure 10:
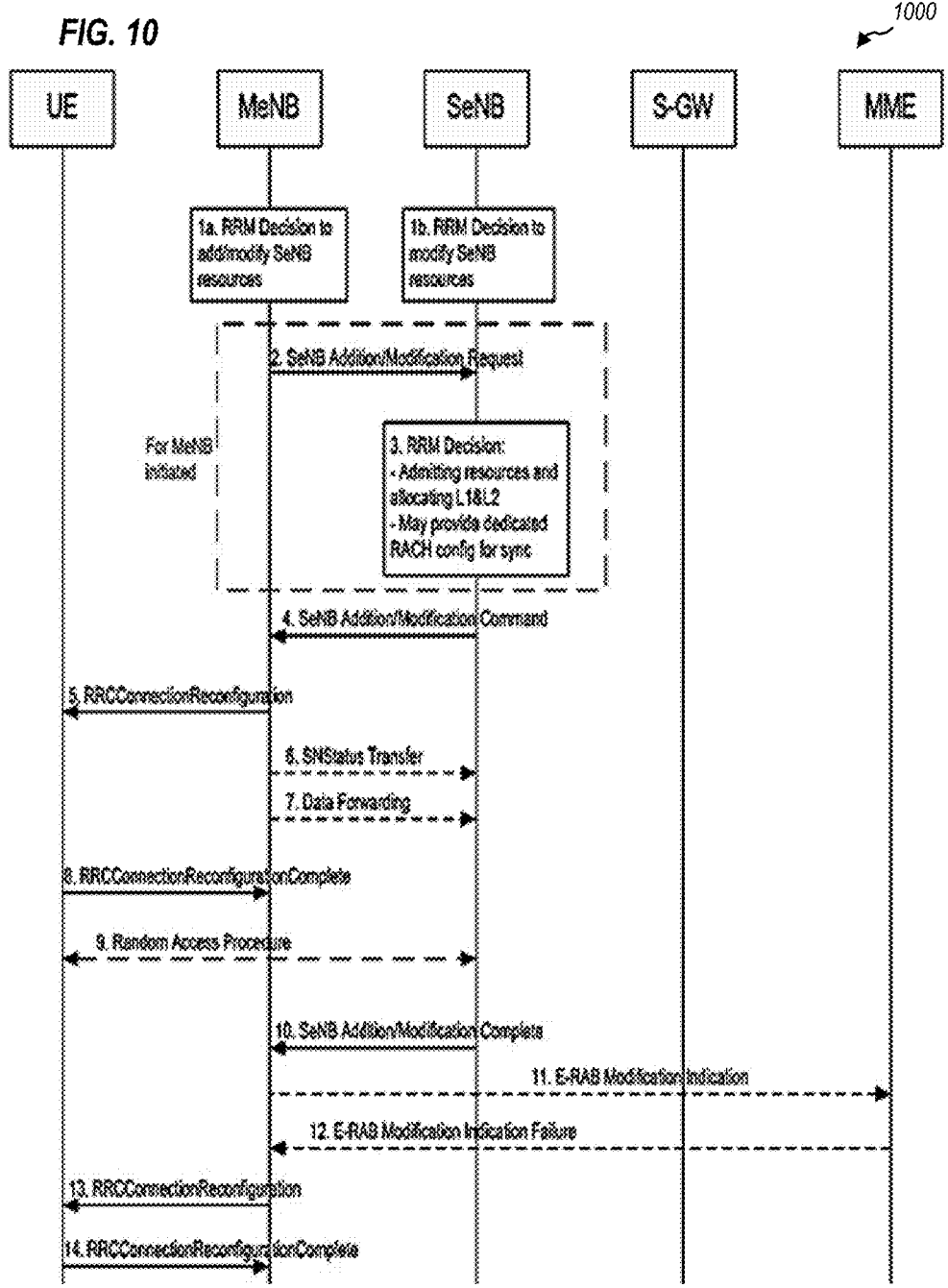
FIG. 10 is a call flow diagram illustrating a call flow for rejecting a bearer relocation request.

Accordingly, in the case of SGW relocation the MME may operate according to one of the following two options. First, if alternative 1A procedures trigger SGW relocation, the MME shall reject the request from the MeNB as shown in FIG. 10 at steps 11 and 12. Second, if alternative 1A procedures trigger SGW relocation, the MME moves all the bearers to the target SGW including any bearers remaining on the MeNB as shown in FIG. 11.

Referring to FIG. 10 and call flow 1000, according to one option the MME rejects the E-RAB modification indication from the MeNB. For example, initially, at steps 1a or 1b, a Radio Resources Management (RRM) layer decision is made by the MeNB or SeNB to add or modify SeNB resources. For an MeNB initiated modification, at step 2, the MeNB sends a modification request to the SeNB, triggering an RRM decision by the SeNB at step 3. If the modification request is not rejected, the SeNB responds at step 4, triggering at step 5 an RRC Connection Reconfiguration message from the MeNB to the UE. Subsequently the MeNB sends at steps 6 and 7, an SNS Status Transfer and Data Forwarding messages to the SeNB. At step 8, the MeNB receives an RRC Connection Reconfiguration Complete message from the UE; after which the UE and SeNB may communicate via a random access procedure at step 9. Once the link is confirmed, the SeNB sends at step 10 an "Addition/Modification Complete" message to the MeNB, triggering the MeNB to send the E-RAB modification indication at step 11.

In step 12, the MME rejects the dual connectivity procedure and indicates that the dual connectivity procedure failed, including a reason code that SGW relocation is required as the reason for the failure. In response to the rejection the MeNB reconfigures the UE to no longer use dual connectivity at the SeNB as shown in steps 13-14. Alternatively, the MeNB may reuse the SeNB release procedure as shown in FIG. 15. It should be appreciated that other reasons may exist for the MME to reject the dual connectivity and send a E-RAB modification indication failure message, including the same reasons the MeNB rejects the dual connectivity as described herein above.

Figure 11:
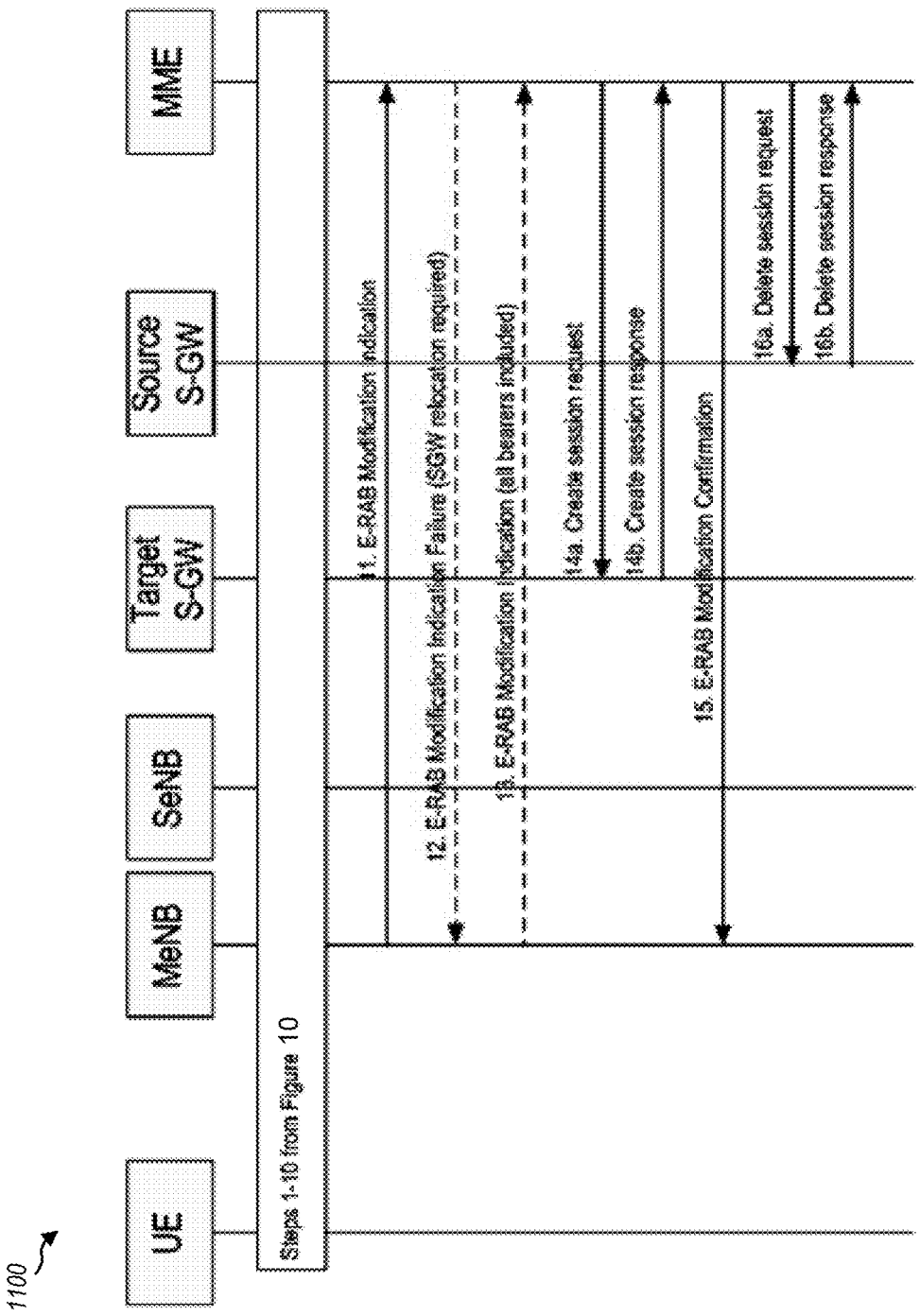
FIG. 11 is a call flow diagram illustrating a design of a call flow for relocating a bearer to a new gateway node.

Referring to FIG. 11 and call flow 1100, an example of SeNB addition/modification including SGW relocation is provided. Steps 1-10 may be the same as call flow 1000 above. Referring to FIG. 11, in response to the E-RAB modification indication at step 11, the MME determines whether all the bearers are being moved to the SeNB, or a subset of bearers. In steps 12-13, the MME indicates that the dual connectivity procedure failed including a reason code that not all the bearers are being moved (and SGW relocation is required) as the reason for the failure. In this case, the MeNB can send a new E-RAB modification indication at step 15 which comprises all the bearers being served by the MeNB and SeNB.

As shown, for example in the table 900 of FIG. 9, for each E-RAB to be served by the SeNB, the MeNB includes the SeNB transport layer address, whereas for each E-RAB to be served by the MeNB, the MeNB includes the MeNB transport layer address. The SGW relocation is transparent to both the UE and SeNB, see table 900.

In alternative embodiments, the MME may skip 12 and 13 and move all the bearers to the target SGW by resubmitting the E-RAB ID, GTP Tunnel Endpoint ID (TEID) and Transport layer address of the existing bearer to the MeNB In step 14, the MME relocates the bearers to the target SGW. The target SGW will also update the tunnel to the PGW.

Figure 12:
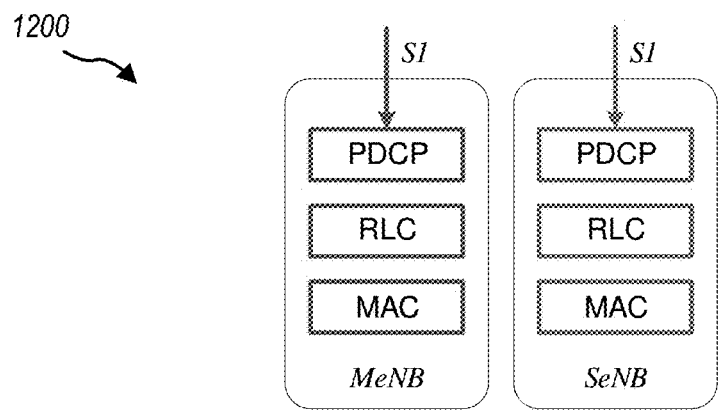
FIG. 12 is a schematic diagram illustrating a first selected architecture (1A) for dual connectivity.
Figure 13:
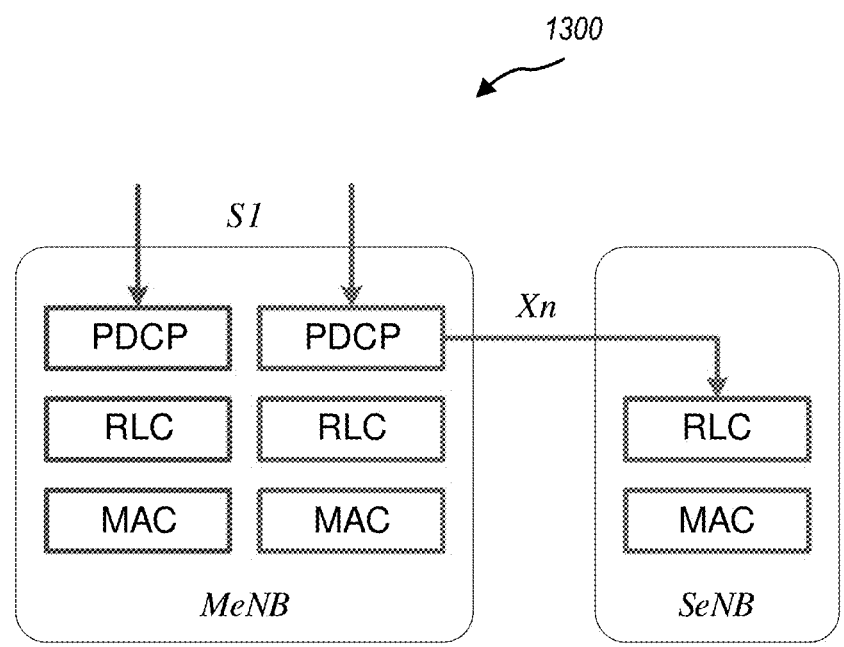
FIG. 13 is a schematic diagram illustrating a first selected architecture (3C) for dual connectivity.

By way of background, certain aspects of architectures "1A" and "3C" are shown in FIGS. 12-13, respectively. The text accompanying the description of FIGS. 12-13 below is adapted from sections 8.1.1.1 and 8.1.1.8 of 3GPP TR 36.842. Alternative 1200 (1A) is the combination of S1-U that terminates in SeNB+independent PDCPs (no bearer split). It is depicted on FIG. 12, showing the downlink direction as an example. The expected benefits of this alternative 1200 (1A) may include: avoiding a need for MeNB to buffer or process packets for an EPS bearer transmitted by the SeNB; preventing impact to PDCP/RLC and GTP-U/UDP/IP; avoiding a need to route all traffic to MeNB; low requirements on the backhaul link between MeNB and SeNB, and avoiding a need for flow control needed between the two; and support of local break-out and content caching at SeNB so as to ber straightforward for dual connectivity UEs. The expected drawbacks of this alternative 1200 (1A) may include: the SeNB mobility is visible to CN;

offloading needs to be performed by MME and cannot be very dynamic; security impacts due to ciphering being required in both MeNB and SeNB; utilization of radio resources across MeNB and SeNB for the same bearer are not possible; for the bearers handled by SeNB, handover-like interruption at SeNB change with forwarding between SeNBs; in the uplink, logical channel prioritization impacts for the transmission of uplink data (radio resource allocation is restricted to the eNB where the Radio Bearer terminates).

Alternative 1300 (3C) is the combination of S1-U that terminates in MeNB+bearer split in MeNB+independent RLCs for split bearers. It is depicted in FIG. 13, taking the downlink direction as an example. The expected benefits of this alternative may include:

SeNB mobility is hidden to CN; avoidance of security impacts with ciphering being required in MeNB only; avoidance of data forwarding between SeNBs required at SeNB change; offloading RLC processing of SeNB traffic from MeNB to SeNB; avoiding impacts to RLC; enabling utilization of radio resources across MeNB and SeNB for the same bearer; relaxing requirements for SeNB mobility (MeNB can be used in the meantime). The expected drawbacks of this alternative may include: requiring routing, processing and buffering all dual connectivity traffic in MeNB; making PDCP responsible for routing PDCP PDUs towards eNBs for transmission and reordering them for reception; requiring flow control between MeNB and SeNB; in the uplink, logical channel prioritization impacts for handling RLC retransmissions and RLC Status PDUs (restricted to the eNB where the corresponding RLC entity resides); and lack of support for local break-out and content caching at SeNB for dual connectivity UEs.

By way of further background, FIG. 14 illustrates a call flow 1400 for SeNB Addition/Modification of dual connectivity bearers. Steps 1-10 may be as described above in connection with FIG. 10. As noted in section G.1 of 3GPP TR 36.842, the call flow 1400 depicts the overall signaling scheme for addition and modification of SeNB resources for dual connectivity operation. This signaling scheme is reproduced here to enable comparison with addition and modification signaling schemes described herein above, and therefore not all details are provided. Text up to step 11 is adapted from G.1 of T.S. 36.842. S1-MME and X2-C signaling part which is relevant for the architecture 1A only is shown with dashed lines (steps 6, 7, 11-13).

As depicted in FIG. 14, activating/modifying resources at SeNB for dual connectivity operation, assuming that S-GW is not changed, could involve the following steps:

At step 1*a*, the MeNB decides to request the SeNB to add or modify radio resources for a specific E-RAB. At step 1*b*, the SeNB decides to modify radio resources for a specific E-RAB.FFS. This step may include additional coordination between the SeNB and MeNB to make sure that, for example, the capabilities of the UE are not exceeded.

At step 2, the MeNB requests the SeNB to allocate/modify radio resources. Depending on the actual scenario, it might contain E-RAB characteristics (E-RAB parameters, TNL address information corresponding to the UP option), UE Capabilities and the current radio resource configuration of the UE, or similar parameters.

At step 3, if the RRM entity in the SeNB is able to admit the resource request, it configures respective radio resources and, dependent on the UP option, respective transport network resources. The SeNB may also allocate dedicated RACH preamble for the UE so that synchronization of the SeNB radio resource configuration can be performed.

At step 4, the SeNB provides the new radio resource configuration to the MeNB (for UP alternative 1A it may contain, dependent on the actual scenario, S1 DL TNL address information for the respective E-RAB, for UP alternative 3C X2 DL TNL address information).

At step 5, the MeNB endorses the new configuration and triggers the UE to apply it. The UE starts to apply the new configuration. At steps 6-7, in case of architecture option 1A the MeNB may, dependent on respective E-RAB characteristics, take actions to minimize service interruption due to activation of dual connectivity (Data forwarding, SN Status Report). At step 8, the UE completes the reconfiguration procedure. In case of architecture option 3C, transmission of user plane data from the SeNB to the UE may take place after step 8 or 9 depending on the synchronization procedure.

At step 9, the UE performs synchronization towards the cell of the SeNB if needed. At step 10, the SeNB reports to MeNB the detection of synchronization with the UE, confirming that the new configuration is in use. Receipt of the message in step 10 by the MeNB successfully completes the overall SeNB Addition/Modification procedure on X2. Depending on the decision on the order of RRC reconfiguration and synchronization or on the support of synchronization, step 10 might be either necessary as described above or in the reverse direction (from MeNB to SeNB).

11.-13. For UP option 1A, if applicable, the update of the UP path towards the EPC is performed.

At step 11, a Master eNB may send an E-RAB modification indication message to the MME for data bearers to be offloaded (which may exclude data bearers whose handling is being modified). This message may include an MME UE S1AP ID for the MME, an eNB UE SLAP ID for the secondary eNB, a list of data bearers to be off-loaded, and pertinent information for each data bearer such as eNB GTP-U addressing information. Step 11 may occur any time after (e.g., immediately following) steps 9 and 10.

In response, at step 12, the MME may send a Modify Bearer Request message to serving gateway/PDN gateway (S-GW). This message may include the list of data bearers to be offloaded and pertinent information for each data bearer such as a data bearer ID (e.g., data bearer IDs for the default data bearer and all dedicated data bearers), TEID and IPv4 address of master eNB for the user plane (which may be used to uniquely identify the default data bearer and the dedicated data bearers of the UE), and/or other information. The MME may send an E-RAB modification confirmation message to the Master eNB (step 13).

Referring to FIG. 15, an illustrative call flow 1500 for SeNB release (MeNB initiated) is shown. The text accompanying FIG. 15 below is adapted from section G.2 of 3GPP TR 36.842. FIG. 15 depicts the MeNB-initiated overall signaling scheme for releasing the SeNB resources towards the UE for dual connectivity operation.

Whether the MeNB requests the SeNB to release a serving cell for one of its UEs and the SeNB creates a container that will result in the release of a serving cell(s); or whether the SeNB initiates and create a container that will result in the release of a serving cell(s); or, whether the MeNB can by itself release a serving cell maintained by the SeNB are topics for further discussion.

As depicted in FIG. 15, releasing the SeNB resources towards the UE for dual connectivity operation may involve the following steps: at step 1, the MeNB decides to remove the SeNB resources towards the UE. At step 2, The MeNB requests the SeNB to release its resources. At step 3, the SeNB follows the MeNB's request. At step 4, the SeNB responds to the MeNB's release request. At step 5, the MeNB signals the reconfiguration to the UE. The UE releases the relevant configuration towards this SeNB. At step 6-7, in case of UP option 1A and respective E-RAB characteristics the MeNB may take actions to minimize service interruption due to release of SeNB resources (Data forwarding, SN Status Report). At step 8, the UE indicates the completion of the reconfiguration procedure. At steps 9-11, for UP option 1A, the update of the UP path towards the EPC is performed. It should be appreciated that call flow 1500 assumes that S-GW is not changed.

FIGS. 16-23 illustrate methodologies and apparatus that summarize aspects of the more detailed description above. These summaries are intended to supplement, and not to supplant, the more detailed aspects described above. As such, it should be appreciated that operations or components included in the summary descriptions may incorporate more detailed aspects of the disclosure in certain embodiments.

Figure 16:
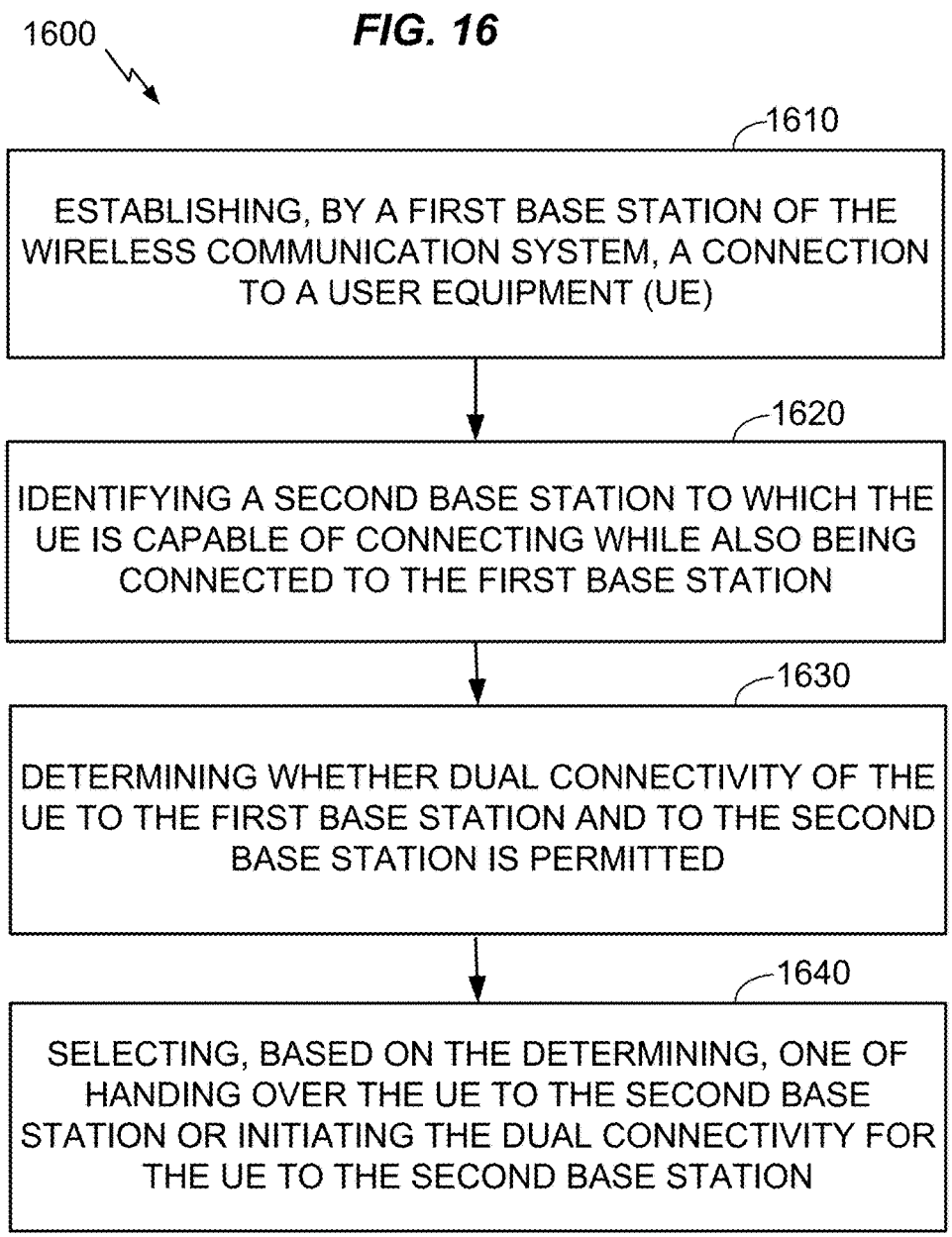

FIG. 16 shows a method 1600 by a master base station for wireless communication supporting duel connectivity of a UE by a MeNB and SeNB. The method 1600 may include, at 1610, establishing, by a first base station (MeNB) of the wireless communication system, a connection to a UE. The method 1600 may further include, at 1620, identifying a second base station (SeNB) to which the UE is capable of connecting while also being connected to the first base station. The method 1600 may further include, at 1630, determining whether dual connectivity of the UE to the first base station and to the second base station is permitted. The method 1600 may further include, at 1640, selecting, based on the determining, one of handing over the UE to the second base station or initiating the dual connectivity for the UE to the second base station.

In several non-exclusive alternative aspects, the determining operation 1630 may be based at least in part on an identity of the second base station, on a configuration of the first base station, on a capability of the second base station to support the dual connectivity, on context information for the connection to the UE provided to the first base station by at least one of a Mobility Management Entity (MME) or another base station, on the QoS requirements of one or more bearers associated with the UE, or on a capability of the UE. The selecting operation 1640 may be based at least in part on a defined priority for the handing over relative to the initiating the dual connectivity, and/or at least in part on a traffic volume of the bearers. In addition, or in the alternative, the selecting 1640 may be further based at least in part on a measurement criteria. In an aspect, the measurement criteria may be based on configuring different measurement events for dual connectivity and hand over.

Figure 17:
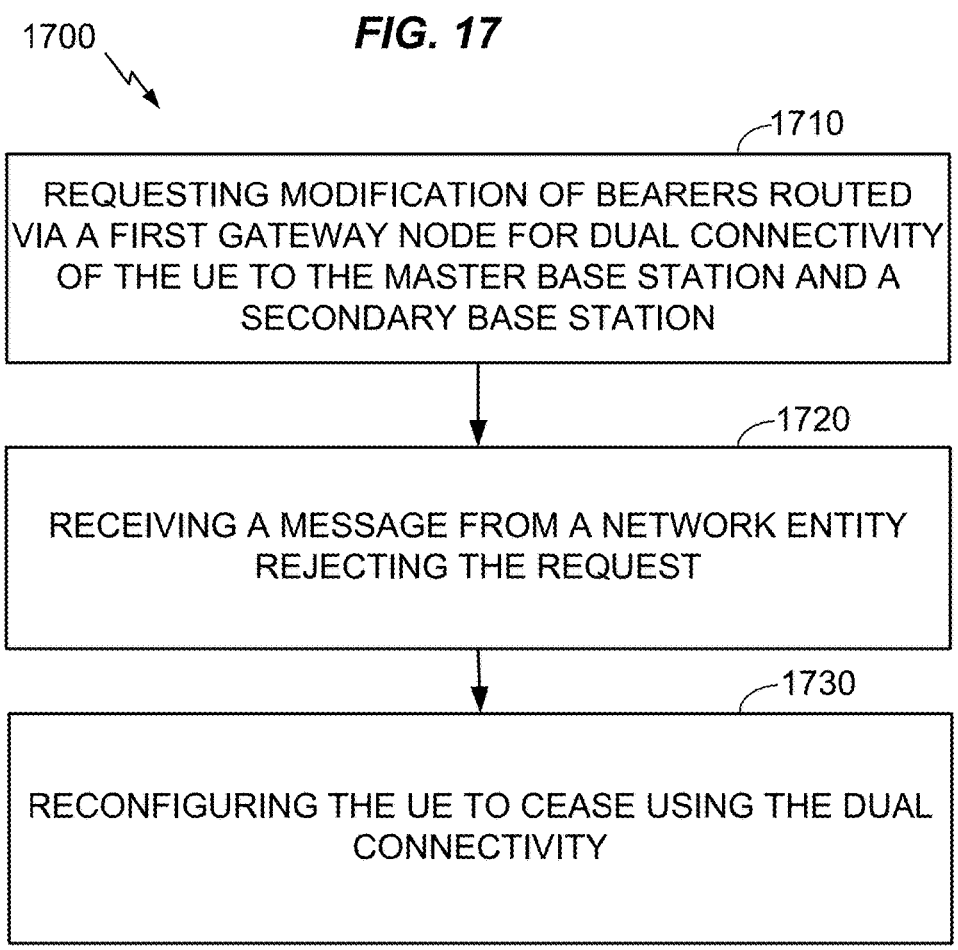

FIG. 17 shows further optional operations or aspects 1700 that may be performed by the master base station in conjunction with the method 1600. The operations shown in FIG. 17 are not required to perform the method 1600. Operations 1700 are independently performed and not mutually exclusive. Therefore any one of such operations may be performed regardless of whether another downstream or upstream operation is performed. If the method 1600 includes at least one of the operations 1700, then the method 1600 may terminate after the at least one operation, without necessarily having to include any subsequent downstream operation(s) that may be illustrated.

For example, the method 1600 may further include, at 1710, requesting modification of bearers routed via a first gateway node for dual connectivity of the UE to the master base station and a secondary base station. Modification may be requested from a network management entity, for example, an MME. The method 1600 may further include, at 1720, receiving a message from the network management entity rejecting the request. The method 1600 may further include, at 1730, reconfiguring the UE to cease using the dual connectivity, in response to the message.

Figure 18:
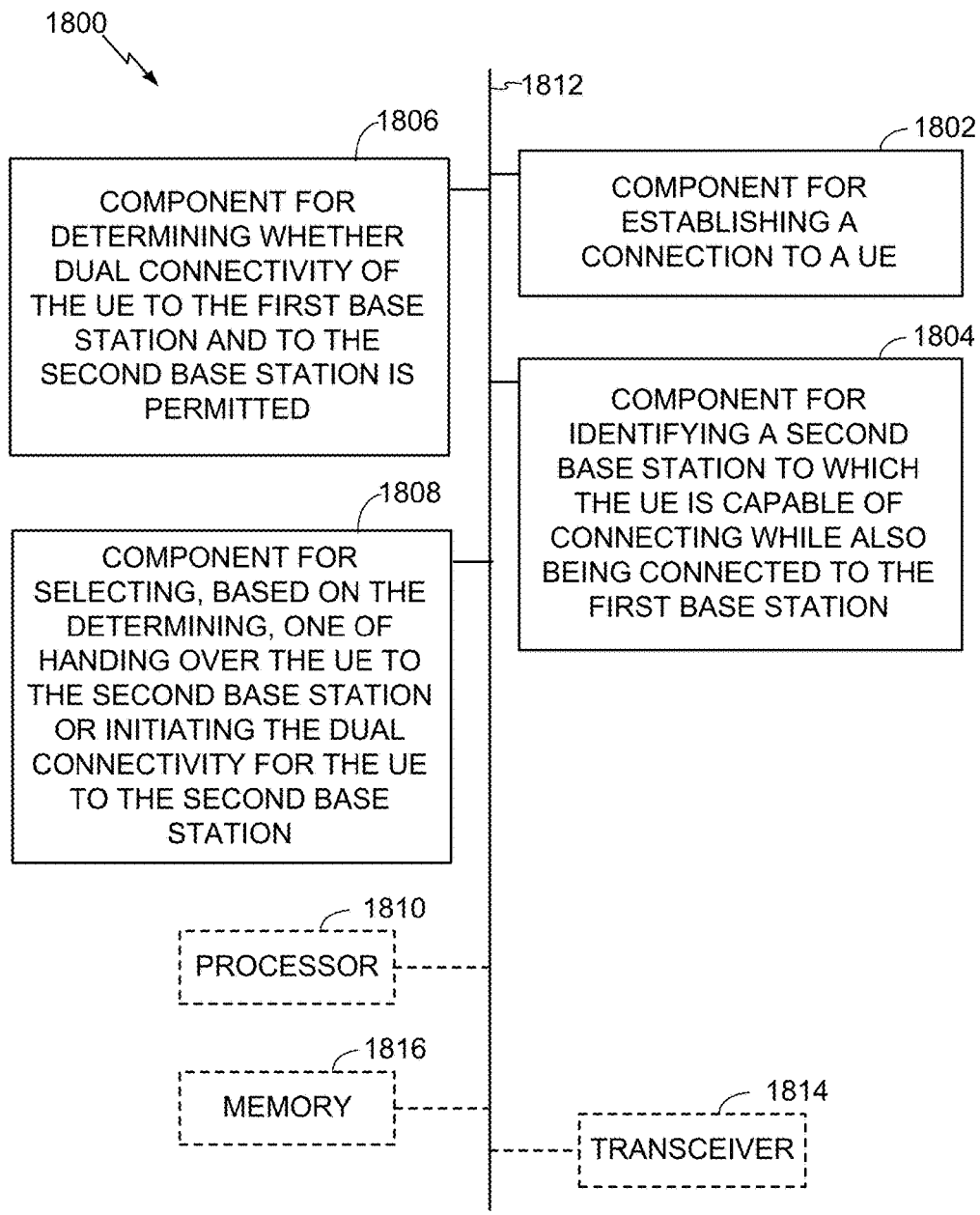

With reference to FIG. 18, there is provided an exemplary apparatus 1800 that may be configured as a base station in a wireless network, or as a processor or similar device for use within the base station, for supporting dual connectivity. The apparatus 1800 may include functional blocks that can represent functions implemented by a processor, software, hardware, or combination thereof (e.g., firmware).

The apparatus 1800 may include an electrical component 1802 for establishing a connection to a UE. For example, the electrical component 1802 may include at least one control processor coupled to a transceiver or the like and to a memory holding instructions for establishing a connection. The component 1802 may be, or may include, a means for establishing a connection to a UE. Said means may include the control processor executing an algorithm including an RRC message exchange with the UE, and configuring a receiver and transmitter according to parameters explicitly or implicitly established by the RRC message exchange.

The apparatus 1800 may include an electrical component 1804 for identifying a second base station to which the UE is capable of connecting while also being connected to the first base station. For example, the electrical component 1804 may include at least one control processor coupled to a transceiver or the like and to a memory holding instructions for performing the identifying. The component 1804 may be, or may include, a means for identifying a second base station to which the UE is capable of connecting while also being connected to the first base station. Said means may include the control processor executing an algorithm including receiving an identifier of the second base station from the UE, or from an MME; in the alternative, or in addition, detecting and/or decoding a wireless signal from the second base station; in the alternative, or in addition, exchanging messages with the second base station.

As illustrated, in one embodiment, the apparatus 1800 may include an electrical component or module 1806 for determining whether dual connectivity of the UE to the first base station and to the second base station is permitted. For example, the electrical component 1806 may include at least one control processor coupled to a transceiver or the like and to a memory with instructions for determining whether dual connectivity of the UE to the first base station and to the second base station is permitted, based on one or more criteria. The component 1806 may be, or may include, a means for determining whether dual connectivity of the UE to the first base station and to the second base station is permitted. Said means may include the control processor executing an algorithm including determining whether the dual connectivity is permitted based at least in part on any one or more of: an identity of the second base station, on a configuration of the first base station, on a capability of the second base station to support the dual connectivity, on context information for the connection to the UE provided to the first base station by at least one of a MME or another base station, on the QoS requirements of one or more bearers associated with the UE, or on a capability of the UE.

The apparatus 1800 may include an electrical component 1808 for selecting, based on the determining, one of handing over the UE to the second base station or initiating the dual connectivity for the UE to the second base station. For example, the electrical component 1808 may include at least one control processor coupled to a transceiver or the like and to a memory holding instructions for performing the selecting. The component 1808 may be, or may include, a means for selecting, based on the determining, one of handing over the UE to the second base station or initiating the dual connectivity for the UE to the second base station. Said means may include the control processor executing an algorithm including performing the selecting e based at least in part on a defined priority for the handing over relative to the initiating the dual connectivity, and/or at least in part on a traffic volume of the bearers. In addition, or in the alternative, the selecting means may be further based at least in part on measurement criteria, which may be based on configuring different measurement events for dual connectivity and hand over.

The apparatus 1800 may include similar electrical components for performing any or all of the additional operations 1800 or aspects described in connection with FIGS. 16-17, which for illustrative simplicity are not shown in FIG. 18.

In related aspects, the apparatus 1800 may optionally include a processor component 1810 having at least one processor, in the case of the apparatus 1800 configured as a master base station. The processor 1810, in such case, may be in operative communication with the components 1802-1808 or similar components via a bus 1812 or similar communication coupling. The processor 1810 may effect initiation and scheduling of the processes or functions performed by electrical components 1802-1808. The processor 1810 may encompass the components 1802-1808, in whole or in part. In the alternative, the processor 1810 may be separate from the components 1802-1808, which may include one or more separate processors.

In further related aspects, the apparatus 1800 may include a radio transceiver component 1814. A stand-alone receiver and/or stand-alone transmitter may be used in lieu of or in conjunction with the transceiver 1814. In the alternative, or in addition, the apparatus 1800 may include multiple transceivers or transmitter/receiver pairs, which may be used to transmit and receive on different carriers. The apparatus 1800 may optionally include a component for storing information, such as, for example, a memory device/component 1816. The computer readable medium or the memory component 1816 may be operatively coupled to the other components of the apparatus 1800 via the bus 1812 or the like. The memory component 1816 may be adapted to store computer readable instructions and data for performing the activity of the components 1802-1808, and subcomponents thereof, or the processor 1810, the additional aspects 900-1100, or the methods disclosed herein. The memory component 1816 may retain instructions for executing functions associated with the components 1802-1808. While shown as being external to the memory 1816, it is to be understood that the components 1802-1808 can exist within the memory 1816.

FIG. 19 shows a method 1900 by a core network entity for wireless communication supporting dual connectivity. The core network entity may be, or may include, a network management entity (for example, an MME) of a wireless communications network. The method 1900 may include, at 1910, receiving, by a core network entity, a request for modification of bearers routed via a first gateway node for dual connectivity of a UE to a master base station and a secondary base station. The method 1900 may include, at 1920, determining that the modification requires the bearers to be relocated to a second gateway node. The method 1900 may include, at 1930, performing at least one of: rejecting the request, or relocating all the bearers associated with the UE to the second gateway node, based on the determining.

In an optional aspect, the method 1900 may include, at 1940, replying to the request with a message indicating a reason for the rejecting. The reason for the rejecting may include, for example, any one or more of: gateway node relocation is required, gateway node relocation is not supported, dual connectivity with the secondary base station is not permitted, and bearers requested are not permitted for dual connectivity including an identification of the specific bearer. The gateway node may be, or may include, a Serving Gateway (SGW).

In several optional aspects of the method 1900, the performing operation 1930 may include rejecting the request if less than all of the bearers associated with the UE are included in the request for modification. In the alternative, or in addition, the performing operation 1930 may include rejecting the request if dual connectivity of the UE to the secondary base station is not permitted. In the alternative, or in addition, the performing operation 1930 may include rejecting the request if one or more of the bearers is not permitted for dual connectivity at the secondary base station. In other optional aspects of the method 1900, the performing operation 1930 may include relocating all the bearers associated with the UE to the second gateway node at least in part by modifying the bearers not included in the request that are associated with the UE to be relocated to the second gateway node, wherein the bearers not included in the request that are associated with the UE continue to be served by the same master base station as before the relocating.

In other optional aspects, the method 1900 may further include identifying one or more of the master base station and secondary base station, based on an identifier included in the request for modification, and/or identifying bearers associated with the UE as being served by a master base station or a secondary base station in the request for modification.

In other optional aspects, the determining operation 1920 may be based at least in part on an identity of the target secondary base station. In the alternative, or in addition, the determining operation 1920 may be based at least in part on whether or not the secondary base station is served by the first gateway node.

Figure 20:
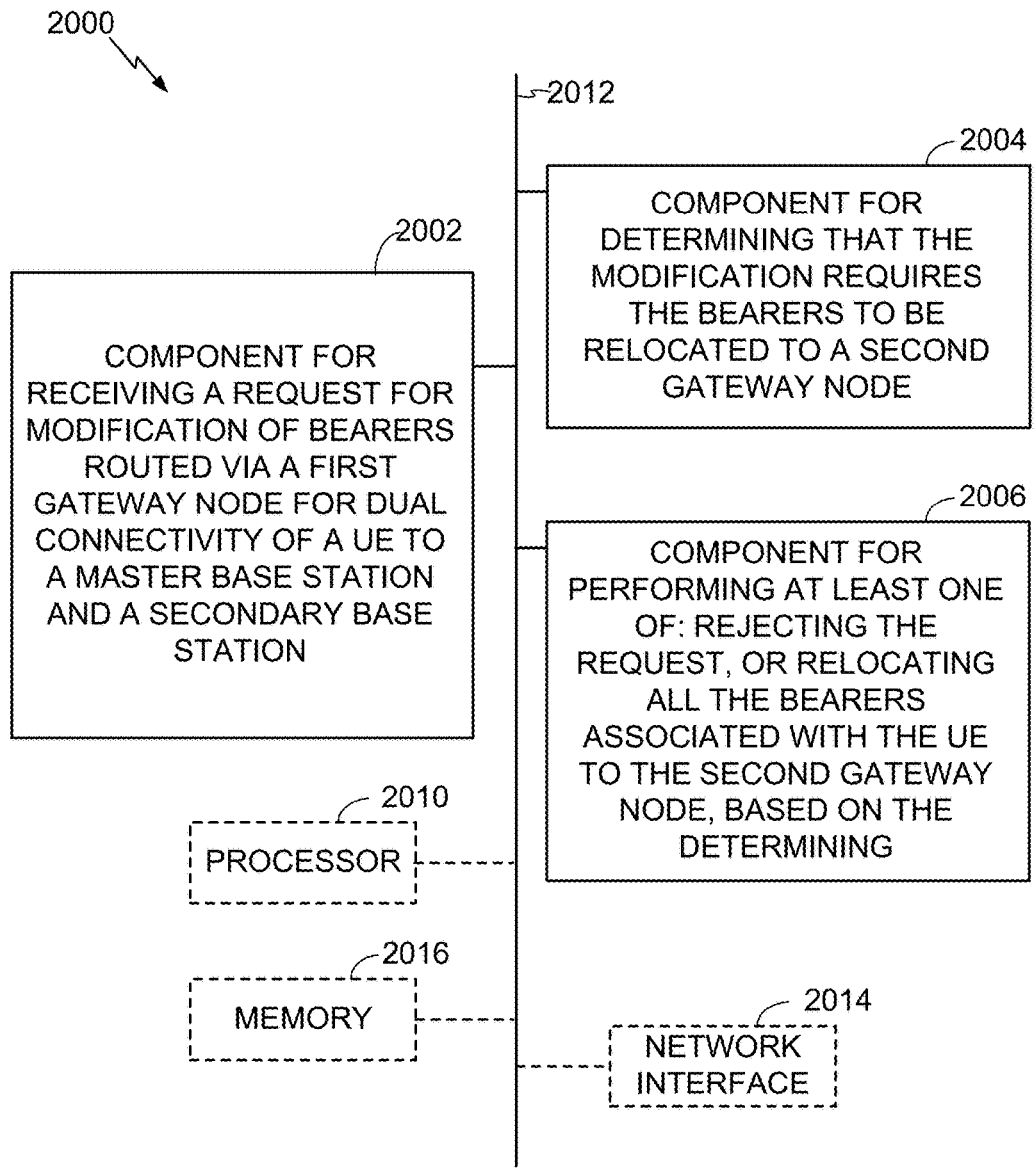

With reference to FIG. 20, there is provided an exemplary apparatus 2000 that may be configured as a core network node (for example, an MME) in a wireless network, or as a processor or similar device for use within the network node, for supporting duel connectivity. The apparatus 2000 may include functional blocks that can represent functions implemented by a processor, software, hardware, or combination thereof (e.g., firmware).

As illustrated, in one embodiment, the apparatus 2000 may include an electrical component or module 2002 for receiving a request for modification of bearers routed via a first gateway node for dual connectivity of a UE to a master base station and a secondary base station. For example, the electrical component 2002 may include at least one control processor coupled to a transceiver or the like and to a memory with instructions for receiving bearer modification requests. The component 2002 may be, or may include, a means for receiving a request for modification of bearers routed via a first gateway node for dual connectivity of a UE to a master base station and a secondary base station. Said means may include, for example, the control processor executing an algorithm including receiving a signal, decoding the signal, and recognizing the signal as a request to modify a bearer.

The apparatus 2000 may include an electrical component 2004 for determining that the modification requires the bearers to be relocated to a second gateway node. For example, the electrical component 2004 may include at least one control processor coupled to a transceiver or the like and to a memory holding instructions for making the determination. The component 2004 may be, or may include, a means for determining that the modification requires the bearers to be relocated to a second gateway node. Said means may include the control processor executing an algorithm including, for example, making the determination based at least in part on an identity of the target secondary base station, and/or on whether or not the secondary base station is served by the first gateway node. For example, if the secondary base station is not served by the first gateway node, the network entity may determine that relocating the bearer is required.

The apparatus 2000 may include an electrical component 2006 for performing at least one of: rejecting the request, or relocating all the bearers associated with the UE to the second gateway node, based on the determining. For example, the electrical component 2006 may include at least one control processor coupled to a transceiver or the like and to a memory holding instructions for rejecting the request or relocating the bearers, based on an outcome of the determining. The component 2006 may be, or may include, a means for performing at least one of: rejecting the request, or relocating all the bearers associated with the UE to the second gateway node, based on the determining. Said means may include the control processor executing an algorithm including, for example, rejecting the request if less than all of the bearers associated with the UE are included in the request for modification; rejecting the request if dual connectivity of the UE to the secondary base station is not permitted; rejecting the request if one or more of the bearers is not permitted for dual connectivity at the secondary base station; or relocating all the bearers associated with the UE to the second gateway node at least in part by modifying the bearers not included in the request that are associated with the UE to be relocated to the second gateway node, wherein the bearers not included in the request that are associated with the UE continue to be served by the same master base station.

The apparatus 2000 may include similar electrical components for performing any or all of the additional operations described in connection with FIG. 19, which for illustrative simplicity are not shown in FIG. 20.

In related aspects, the apparatus 2000 may optionally include a processor component 2010 having at least one processor, in the case of the apparatus 2000 configured as a network entity. The processor 2010, in such case, may be in operative communication with the components 2002-2006 or similar components via a bus 2012 or similar communication coupling. The processor 2010 may effect initiation and scheduling of the processes or functions performed by electrical components 2002-2006. The processor 2010 may encompass the components 2002-2006, in whole or in part. In the alternative, the processor 2010 may be separate from the components 2002-2006, which may include one or more separate processors.

In further related aspects, the apparatus 2000 may include a network interface component 2014, for example a network port, such as for a wired, fiber optic, or wireless network interface. The apparatus 2000 may optionally include a component for storing information, such as, for example, a memory device/component 2016. The computer readable medium or the memory component 2016 may be operatively coupled to the other components of the apparatus 2000 via the bus 2012 or the like. The memory component 2016 may be adapted to store computer readable instructions and data for performing the activity of the components 2002-2006, and subcomponents thereof, or the processor 2010, the additional aspects discussed in connection with FIG. 19, or the methods disclosed herein. The memory component 2016 may retain instructions for executing functions associated with the components 2002-2006. While shown as being external to the memory 2016, it is to be understood that the components 2002-2006 can exist within the memory 2016.

Figure 21:
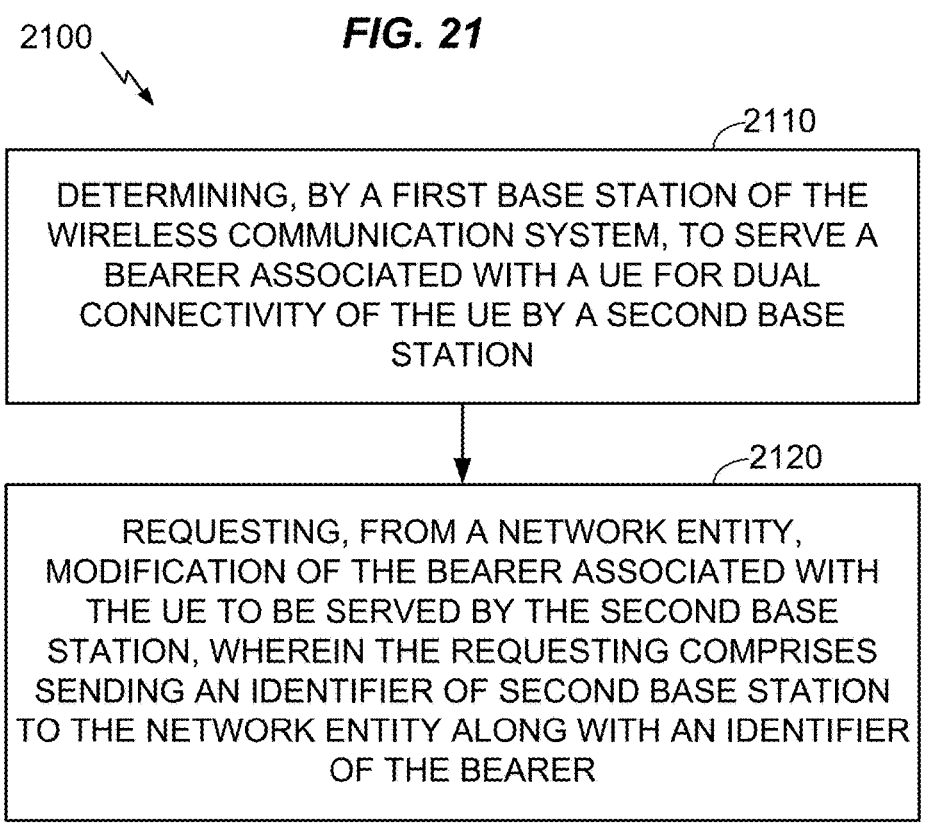

FIG. 21 shows a method 2100 by a base station for wireless communication, including requesting modification of a bearer supporting dual connectivity for a UE. The base station may be a master base station (e.g., MeNB) of a wireless communications network. The method 2100 may include, at 2110, determining, by a first base station of the wireless communication system, to serve a bearer associated with a UE for dual connectivity of the UE by a second base station. The method 2100 may further include, at 2120, requesting, from a network entity (e.g., an MME or similar core network management entity), modification of the bearer associated with the UE to be served by the second base station, wherein the requesting comprises sending an identifier of second base station to the network entity along with an identifier of the bearer. In an aspect, the determining to serve a bearer 2110 may be based at least in part on one or more of: a measurement criteria related to the second base station; a loading of the second base station; the QoS requirements of the bearer; and/or a traffic volume of the bearers.

With reference to FIG. 22, there is provided an exemplary apparatus 2200 that may be configured as a master base station in a wireless network, or as a processor or similar device for use within the master base station, for supporting relocation of a bearer used in dual connectivity. The apparatus 2200 may include functional blocks that can represent functions implemented by a processor, software, hardware, or combination thereof (e.g., firmware).

As illustrated, in one embodiment, the apparatus 2200 may include an electrical component or module 2202 for determining, by a first base station of the wireless communication system, to serve a bearer associated with a UE for dual connectivity of the UE by a second base station. For example, the electrical component 2202 may include at least one control processor coupled to a transceiver or the like and to a memory with instructions for making the determination. The component 2202 may be, or may include, a means for determining, by a first base station of the wireless communication system, to serve a bearer associated with a UE for dual connectivity of the UE by a second base station. Said means may include the control processor executing an algorithm including determining to serve a bearer based at least in part on one or more of: a measurement criteria related to the second base station; a loading of the second base station; the QoS requirements of the bearer; and/or a traffic volume of the bearers.

The apparatus 2200 may include an electrical component 2204 for requesting, from a network entity, modification of the bearer associated with the UE to be served by the second base station, wherein the requesting comprises sending an identifier of second base station to the network entity with an identifier of the bearer. For example, the electrical component 2204 may include at least one control processor coupled to a transceiver or the like and to a memory holding instructions for the requesting. The component 2204 may be, or may include, a means for requesting, from a network entity, modification of the bearer associated with the UE to be served by the second base station, wherein the requesting comprises sending an identifier of second base station to the network entity with an identifier of the bearer. Said means may include the control processor executing an algorithm including, for example, preparing a message formatted according to a modification request protocol, including the identifier in the message, and transmitting the message via a network interface to the network entity (e.g., to an MME).

The apparatus 2200 may include similar electrical components for performing any or all of the additional operations described in connection with FIG. 21, which for illustrative simplicity are not shown in FIG. 22.

In related aspects, the apparatus 2200 may optionally include a processor component 2210 having at least one processor, in the case of the apparatus 2200 configured as a network entity. The processor 2210, in such case, may be in operative communication with the components 2202-2204 or similar components via a bus 2212 or similar communication coupling. The processor 2210 may effect initiation and scheduling of the processes or functions performed by electrical components 2202-2204. The processor 2210 may encompass the components 2202-2204, in whole or in part. In the alternative, the processor 2210 may be separate from the components 2202-2204, which may include one or more separate processors.

In further related aspects, the apparatus 2200 may include a radio transceiver component 2214. A stand-alone receiver and/or stand-alone transmitter may be used in lieu of or in conjunction with the transceiver 2214. In the alternative, or in addition, the apparatus 2200 may include multiple transceivers or transmitter/receiver pairs, which may be used to transmit and receive on different carriers. The apparatus 2200 may optionally include a component for storing information, such as, for example, a memory device/component 2216. The computer readable medium or the memory component 2216 may be operatively coupled to the other components of the apparatus 2200 via the bus 2212 or the like. The memory component 2216 may be adapted to store computer readable instructions and data for performing the activity of the components 2202-2204, and subcomponents thereof, or the processor 2210, the additional aspects described in connection with FIG. 21, or the methods disclosed herein. The memory component 2216 may retain instructions for executing functions associated with the components 2202-2204. While shown as being external to the memory 2216, it is to be understood that the components 2202-2204 can exist within the memory 2216.

Figure 23:
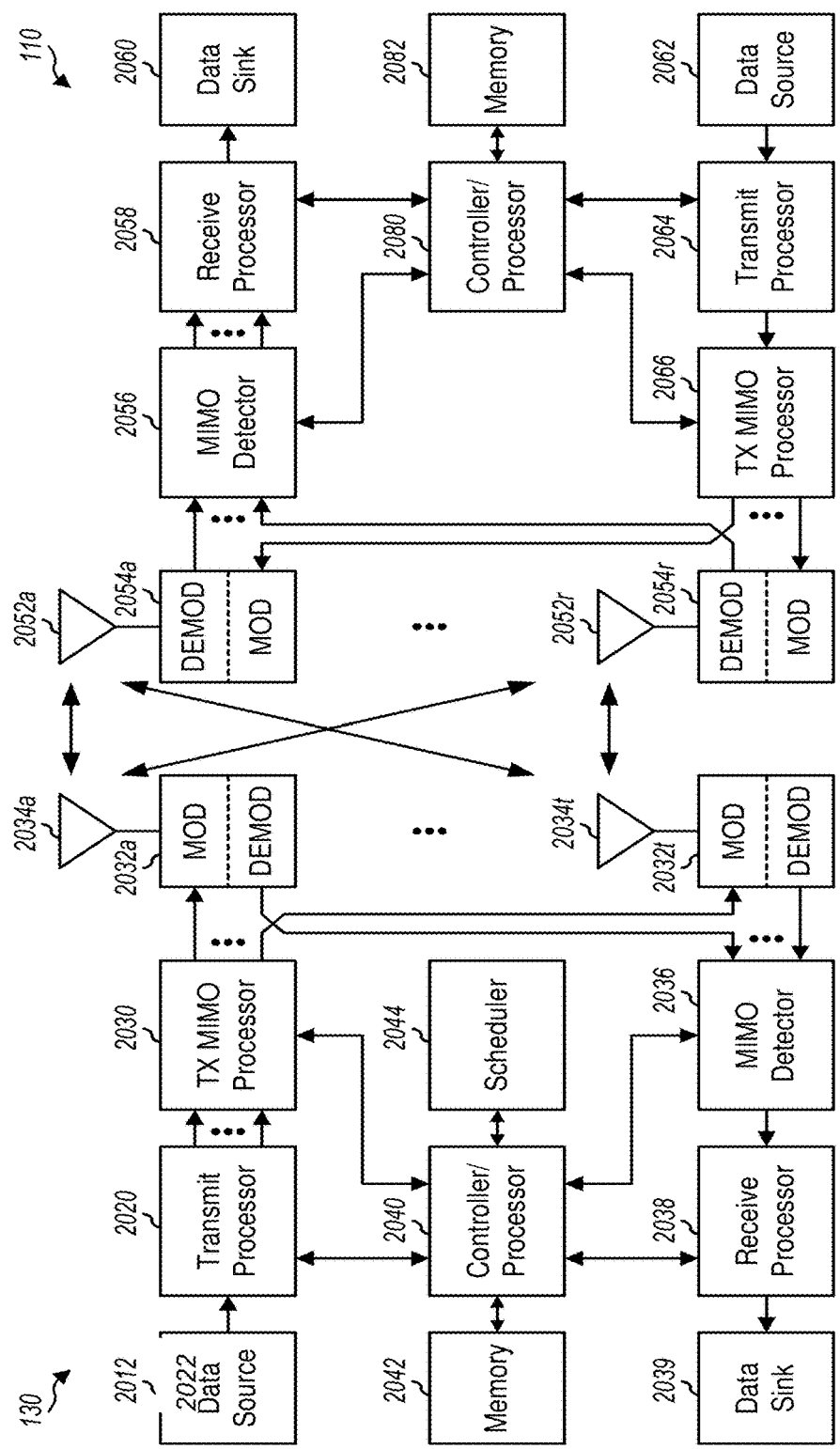
FIG. 23 is a block diagram illustrating an exemplary design of a UE and an eNB/base station as depicted in FIG. 1.

FIG. 23 shows a more detailed example of UE 110 and eNB/base station 130 in FIG. 1. eNB 130 may be equipped with T antennas 2034a through 2034t, and UE 110 may be equipped with R antennas 2052a through 2052r, where in general T≥1 and R≥1.

At eNB 130, a transmit processor 2020 may receive data for one or more UEs from a data source 2022 and control information from a controller/processor 2040. Data source 2022 may implement data buffers for all data bearers configured for UE 110 and other UEs served by eNB 130. Transmit processor 2020 may process (e.g., encode, interleave, and symbol map) the data and control information to obtain data symbols and control symbols, respectively. Transmit processor 2020 may also generate reference symbols for one or more reference signals. A transmit (TX) multiple-input multiple-output (MIMO) processor 2030 may perform spatial processing (e.g., pre-coding) on the data symbols, the control symbols, and/or the reference symbols, if applicable, and may provide T output symbol streams to T modulators (MODs) 2032a through 2032t. Each modulator 2032 may process a respective output symbol stream (e.g., for OFDM, SC-FDMA, CDMA, etc.) to obtain an output sample stream. Each modulator 2032 may further process (e.g., convert to analog, amplify, filter, and upconvert) the output sample stream to obtain an uplink signal. T uplink signals from modulators 2032a through 2032t may be transmitted via T antennas 2034a through 2034t, respectively.

At UE 110, antennas 2052a through 2052r may receive the downlink signals from eNB 130 and other eNBs and may provide received signals to demodulators (DEMODs) 2054a through 2054r, respectively. Each demodulator 2054 may condition (e.g., filter, amplify, downconvert, and digitize) a respective received signal to obtain received samples. Each demodulator 2054 may further process the received samples to obtain received symbols. A MIMO detector 2056 may obtain received symbols from all R demodulators 2054a through 2054r and may perform MIMO detection on the received symbols to obtain detected symbols. A receive processor 2058 may process (e.g., symbol demap, deinterleave, and decode) the detected symbols, provide decoded data to a data sink 2060, and provide decoded control information to a controller/processor 2080.

On the uplink, at UE 110, data from a data source 2062 and control information from controller/processor 2080 may be processed by a transmit processor 2064, pre-coded by a TX MIMO processor 2066 if applicable, conditioned by modulators 2054a through 2054r, and transmitted to eNB 130 and other eNBs. At eNB 130, the uplink signals from UE 110 and other UEs may be received by antennas 2034, conditioned by demodulators 2032, processed by a MIMO detector 2036, and further processed by a receive processor 2038 to obtain the data and control information sent by UE 110 and other UEs. Processor 2038 may provide the decoded data to a data sink 2039 and the decoded control information to controller/processor 2040.

Controllers/processors 2040 and 2080 may direct the operation at eNB 130 and UE 110, respectively. Memories 2042 and 2082 may store data and program codes for eNB 130 and UE 110, respectively. A scheduler 2044 may schedule UE 110 and other UEs for data transmission on the downlink and uplink and may assign resources to the scheduled UEs. Processor 2040 and/or other processors and modules at eNB 130 or eNB 132 may perform or direct the operation performed by MeNB or SeNB, respectively, in call flow 1000 in FIG. 10, call flow 1100 in FIG. 11, call flow 1400 in FIG. 14, call flow 1500 in FIG. 15, process 1600 with or without operations 1700 in FIGS. 16-17, process 1900 in FIG. 19, process 2100 in FIG. 21, and/or other call flows and processes for the techniques described herein. Processor 2080 and/or other processors and modules at UE 110 may perform or direct the operation of UE 110 in call flows 1000, 1100, 1400, 1500, and/or other call flows and processes for the techniques described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
establishing, by a first base station of a wireless communication system, a connection to a User Equipment (UE);
identifying a second base station to which the UE is capable of connecting while also being connected to the first base station;
determining, by the first base station and based at least in part on information regarding quality of service (QoS) requirements associated with the UE, whether dual connectivity of the UE to the first base station and to the second base station is permitted; and
selecting, based on the determining, one of handing over the UE to the second base station or initiating the dual connectivity for the UE to the second base station.

2. The method of claim 1, further comprising:
requesting a modification of bearers routed via a first gateway node for dual connectivity of the UE to the first base station and the second base station.

3. The method of claim 2, further comprising:
receiving an indication of a serving gateway relocation based on the requesting of the modification of the bearers.

4. The method of claim 1, wherein the determining whether the dual connectivity is permitted is further based at least in part on an identity of the second base station.

5. The method of claim 1, wherein the determining whether the dual connectivity is permitted is further based at least in part on a configuration of the first base station.

6. The method of claim 1, wherein the determining whether the dual connectivity is permitted is further based at least in part on a capability of the second base station to support the dual connectivity.

7. The method of claim 1, wherein the determining whether the dual connectivity is permitted is further based at least in part on context information for the connection to the UE provided to the first base station by at least one of a Mobility Management Entity (MME) or another base station.

8. The method of claim 1, wherein the QoS requirements are of one or more bearers associated with the UE.

9. The method of claim 1, wherein the selecting is further based at least in part on a defined priority for the handing over relative to the initiating the dual connectivity.

10. The method of claim 1, wherein the selecting is further based at least in part on a measurement criteria.

11. The method of claim 1, wherein the selecting is further based at least in part on a traffic volume of one or more bearers associated with the UE.

12. A first base station of a wireless communication system, comprising:
means for establishing, by the first base station, a connection to a User Equipment (UE);
means for identifying a second base station to which the UE is capable of connecting while also being connected to the first base station;
means for determining, by the first base station and based at least in part on information regarding quality of service (QoS) requirements associated with the UE, whether dual connectivity of the UE to the first base station and to the second base station is permitted; and
means for selecting, based on the determining, one of handing over the UE to the second base station or initiating the dual connectivity for the UE to the second base station.

13. The first base station of claim 12, wherein the determining whether the dual connectivity is permitted is further based at least in part on one or more of an identity of the second base station, a configuration of the first base station, a capability of the second base station to support the dual connectivity, or context information for the connection to the UE provided to the first base station by at least one of a Mobility Management Entity (MME) or another base station.

14. The first base station of claim 12, wherein the selecting is further based at least in part on one or more of a defined priority for the handing over relative to the initiating the dual connectivity, a measurement criteria, or a traffic volume of one or more bearers associated with the UE.

15. The first base station of claim 12, wherein the QoS requirements are of one or more bearers associated with the UE.

16. The first base station of claim 12, further comprising:
means for requesting a modification of bearers routed via a first gateway node for dual connectivity of the UE to the first base station and the second base station.

17. A non-transitory computer-readable medium storing instructions, the instructions comprising:
one or more instructions that, when executed by a processor, cause the processor to:
receive a request for modification of bearers routed via a first gateway node for dual connectivity of a User Equipment (UE) to a master base station and a secondary base station;
determine that the modification requires the bearers to be relocated to a second gateway node; and
perform, based on the determining, at least one of: rejecting the request, or relocating all the bearers associated with the UE to the second gateway node, wherein the one or more instructions to perform at least one of rejecting the request or relocating all the bearers comprise:
one or more instructions to reject the request if less than all of the bearers associated with the UE are included in the request for modification.

18. The non-transitory computer-readable medium of claim 17, wherein the one or more instructions to perform at least one of rejecting the request or relocating all the bearers comprise:
one or more instructions to reject the request if dual connectivity of the UE to the secondary base station is not permitted.

19. The non-transitory computer-readable medium of claim 17, wherein the one or more instructions to perform at least one of rejecting the request or relocating all the bearers comprise:
one or more instructions to perform rejecting the request if one or more of the bearers is not permitted for dual connectivity at the secondary base station.

20. The non-transitory computer-readable medium of claim 17, wherein the instructions further comprise:
one or more instructions to reply to the request with a message indicating a reason for the rejecting, the reason comprising one or more of: gateway node relocation is required, gateway relocation is not supported, dual connectivity with the secondary base station is not permitted, or the bearers for which the modification is requested are not permitted for dual connectivity including an identification of a specific bearer.

21. The non-transitory computer-readable medium of claim 17, wherein the instructions further comprise:

one or more instructions to identify one or more of the master base station or the secondary base station based on an identifier included in the request for the modification of the bearers.

22. The non-transitory computer-readable medium of claim 17, wherein the instructions further comprise:
one or more instructions to identify bearers associated with the UE as being served by the master base station or the secondary base station in the request for the modification of the bearers.

23. The non-transitory computer-readable medium of claim 17,
wherein the one or more instructions to perform at least one of rejecting the request or relocating all the bearers comprise:
one or more instructions to relocate all the bearers associated with the UE to the second gateway node by modifying the bearers not included in the request that are associated with the UE to be relocated to the second gateway node, and
wherein the bearers not included in the request that are associated with the UE continue to be served by the master base station.

24. The non-transitory computer-readable medium of claim 17, wherein the one or more instructions to determine that the modification requires the bearers to be relocated to the second gateway node comprise:
one or more instructions to determine that the modification requires the bearers to be relocated to the second gateway node based on an identity of the secondary base station.

25. The non-transitory computer-readable medium of claim 17, wherein the one or more instructions to determine that the modification requires the bearers to be relocated to the second gateway node comprise:
one or more instructions to determine that the modification requires the bearers to be relocated to the second gateway node based on whether or not the secondary base station is served by the first gateway node.

26. An apparatus configured for wireless communication, the apparatus comprising:
at least one processor configured to:
receive a request for modification of bearers routed via a first gateway node for dual connectivity of a User Equipment (UE) to a master base station and a secondary base station;
determine that the modification requires the bearers to be relocated to a second gateway node; and
perform at least one of: rejecting the request, or relocating all the bearers associated with the UE to the second gateway node, based on the determining,
wherein, when performing at least one of rejecting the request or relocating all the bearers associated with the UE to the second gateway node, the at least one processor is configured to:
perform rejecting the request if less than all of the bearers associated with the UE are included in the request for the modification.

27. The apparatus of claim 26, wherein, when performing at least one of rejecting the request or relocating all the bearers associated with the UE to the second gateway node, the at least one processor is further configured to:
perform rejecting the request if the dual connectivity of the UE to the secondary base station is not permitted or if one or more of the bearers is not permitted for the dual connectivity at the secondary base station.

28. The apparatus of claim 26,
wherein, when performing at least one of rejecting the request or relocating all the bearers associated with the UE to the second gateway node, the at least one processor is configured to:
perform relocating all the bearers associated with the UE to the second gateway node by modifying bearers not included in the request that are associated with the UE to be relocated to the second gateway node, and
wherein the bearers not included in the request that are associated with the UE continue to be served by the master base station.

29. The apparatus of claim 26, wherein, when determining that the modification requires the bearers to be relocated to the second gateway node, the at least one processor is configured to:
determine that the modification requires the bearers to be relocated to the second gateway node based on an identity of the secondary base station.

30. The apparatus of claim 26, wherein, when determining that the modification requires the bearers to be relocated to the second gateway node, the at least one processor is configured to:
determine that the modification requires the bearers to be relocated to the second gateway node based on whether or not the secondary base station is served by the first gateway node.

* * * * *